(12) United States Patent
Wallace

(10) Patent No.: US 9,045,351 B2
(45) Date of Patent: Jun. 2, 2015

(54) ZERO DISCHARGE WATER DESALINATION PLANT WITH MINERALS EXTRACTION INTEGRATED WITH NATURAL GAS COMBINED CYCLE POWER GENERATION

(75) Inventor: Paul Steven Wallace, Katy, TX (US)

(73) Assignee: HL Seawater Holdings, LLC, Houston, TX (US)

( * ) Notice: Subject to any disclaimer, the term of this patent is extended or adjusted under 35 U.S.C. 154(b) by 792 days.

(21) Appl. No.: 12/818,740

(22) Filed: Jun. 18, 2010

(65) Prior Publication Data
US 2011/0198285 A1   Aug. 18, 2011

Related U.S. Application Data

(60) Provisional application No. 61/305,193, filed on Feb. 17, 2010.

(51) Int. Cl.
  *C02F 9/00*   (2006.01)
  *C02F 1/44*   (2006.01)
  (Continued)

(52) U.S. Cl.
  CPC . *C02F 9/00* (2013.01); *C02F 1/442* (2013.01); *C01B 7/03* (2013.01); *C01B 7/035* (2013.01);
  (Continued)

(58) Field of Classification Search
  CPC ................ C02F 9/00; C02F 1/04; C02F 1/38; C02F 1/44; C02F 1/441; C02F 1/442; C02F 1/444; C02F 1/5236; C02F 1/66; C02F 1/76; C02F 2101/10; C02F 2101/108; C02F 2103/08; C02F 2303/20; C01B 7/03; C01B 7/035; C01B 7/096; C01B 35/1045; C01F 11/24; C01F 11/46; C01F 5/14; F01K 13/00; C01D 3/06; C01D 1/02; C01D 1/20
  See application file for complete search history.

(56) References Cited

U.S. PATENT DOCUMENTS 3,350,292 A * 10/1967 Weinberger et al. .......... 210/651
4,083,781 A *  4/1978 Conger ......................... 210/651
(Continued)

FOREIGN PATENT DOCUMENTS

WO    2007094659 A1    8/2007

OTHER PUBLICATIONS

Dirach et al., Extraction of strategic materials from the concentrated brine rejected by integrated nuclear desalination systems, 2005, Desalination 182, pp. 449-460.*
(Continued)

*Primary Examiner* — David C Mellon
(74) *Attorney, Agent, or Firm* — Fletcher Yoder, P.C.

(57) ABSTRACT

A desalination and minerals extraction process includes a desalination facility fluidly coupled to a minerals extraction facility. The desalination facility includes a nanofiltration membrane section producing a first tailings stream and a reverse osmosis membrane section producing a second tailings stream and a desalinated water outlet stream from an inlet feed stream. The extraction facility produces at least one mineral compound, an extraction tailings stream, and a second desalinated water outlet stream. At least one of the first tailings stream and the second tailings stream is fed into the extraction facility. In certain exemplary embodiments, a natural gas combined cycle power unit supplies power to at least one of the desalination facility and the extraction facility. In certain exemplary embodiments, the extraction tailings stream is recycled into the desalination facility and there are no extraction tailings streams or desalination tailings streams discharged into the environment.

33 Claims, 12 Drawing Sheets

(51) Int. Cl.

| | | |
|---|---|---|
| C02F 1/38 | (2006.01) | |
| C02F 1/04 | (2006.01) | |
| C02F 1/66 | (2006.01) | |
| C02F 1/76 | (2006.01) | |
| F01K 13/00 | (2006.01) | |
| C01F 11/24 | (2006.01) | |
| C01F 11/46 | (2006.01) | |
| C01F 5/14 | (2006.01) | |
| C01B 7/03 | (2006.01) | |
| C01B 7/09 | (2006.01) | |
| C01B 35/10 | (2006.01) | |
| C01D 3/06 | (2006.01) | |
| C01D 1/02 | (2006.01) | |
| C01D 1/20 | (2006.01) | |
| C02F 1/52 | (2006.01) | |
| C02F 101/10 | (2006.01) | |
| C02F 103/08 | (2006.01) | |

(52) U.S. Cl.
CPC ............. *C01B 7/096* (2013.01); *C01B 35/1045* (2013.01); *C01D 1/02* (2013.01); *C01D 1/20* (2013.01); *C01D 3/06* (2013.01); *C01F 5/14* (2013.01); *C01F 11/24* (2013.01); *C01F 11/46* (2013.01); *C02F 1/04* (2013.01); *C02F 1/38* (2013.01); *C02F 1/44* (2013.01); *C02F 1/441* (2013.01); *C02F 1/444* (2013.01); *C02F 1/5236* (2013.01); *C02F 1/66* (2013.01); *C02F 1/76* (2013.01); *C02F 2101/10* (2013.01); *C02F 2101/108* (2013.01); *C02F 2103/08* (2013.01); *C02F 2303/20* (2013.01); *F01K 13/00* (2013.01)

(56) References Cited

U.S. PATENT DOCUMENTS

| | | | |
|---|---|---|---|
| 4,127,235 A | | 11/1978 | Klaile et al. |
| 4,163,046 A | | 7/1979 | Subramanian et al. |
| 4,169,789 A | * | 10/1979 | Lerat .............................. 210/636 |
| 4,298,442 A | | 11/1981 | Giuffrida |
| 4,381,232 A | | 4/1983 | Brown |
| 4,405,463 A | | 9/1983 | Jost et al. |
| 4,436,429 A | | 3/1984 | Strong et al. |
| 4,725,425 A | | 2/1988 | Lesher et al. |
| 5,221,528 A | | 6/1993 | Jongema |
| 5,250,185 A | | 10/1993 | Tao et al. |
| 5,366,514 A | | 11/1994 | Becnel, Jr. et al. |
| 5,417,491 A | | 5/1995 | Hornung et al. |
| 5,683,587 A | * | 11/1997 | Ferrara et al. .................. 210/696 |
| 5,765,945 A | | 6/1998 | Palmer |
| 5,814,224 A | * | 9/1998 | Khamizov et al. ............ 210/638 |
| 5,858,240 A | | 1/1999 | Twardowski et al. |
| 5,925,255 A | | 7/1999 | Mukhopadhyay |
| 6,030,535 A | | 2/2000 | Hayashi et al. |
| 6,036,740 A | | 3/2000 | Miller et al. |
| 6,059,974 A | * | 5/2000 | Scheurman, III ............. 210/662 |
| 6,183,644 B1 | | 2/2001 | Adams et al. |
| 6,280,630 B1 | * | 8/2001 | Ramsay ......................... 210/711 |
| 6,461,491 B1 | | 10/2002 | Hryn et al. |
| 6,482,305 B1 | | 11/2002 | Mani |
| 6,783,682 B1 | * | 8/2004 | Awerbuch ...................... 210/652 |
| 7,083,730 B2 | | 8/2006 | Davis |
| 7,147,361 B2 | | 12/2006 | Cecala et al. |
| 7,392,848 B1 | | 7/2008 | Bader |
| 7,459,088 B2 | | 12/2008 | Davis |
| 7,501,064 B2 | | 3/2009 | Schmidt et al. |
| 7,595,001 B2 | | 9/2009 | Arakel et al. |
| 7,861,955 B2 | | 1/2011 | Tracy et al. |
| 2001/0029732 A1 | * | 10/2001 | Bachmann .................... 60/39.02 |
| 2004/0055955 A1 | * | 3/2004 | Davis ............................ 210/652 |
| 2007/0084778 A1 | * | 4/2007 | St.Germain et al. ....... 210/321.6 |
| 2007/0189945 A1 | | 8/2007 | Kopp et al. |
| 2008/0185340 A1 | | 8/2008 | Bargeman et al. |
| 2008/0237123 A1 | | 10/2008 | Marston |
| 2009/0127360 A1 | | 5/2009 | Tracy et al. |
| 2010/0126135 A1 | * | 5/2010 | Joshi et al. .................... 60/39.12 |
| 2010/0163471 A1 | | 7/2010 | Elyanow et al. |
| 2011/0198285 A1 | | 8/2011 | Wallace |
| 2011/0289846 A1 | | 12/2011 | Shaw et al. |
| 2011/0303607 A1 | | 12/2011 | Vora et al. |

OTHER PUBLICATIONS

Jeppesen et al., Metal recovery from reverse osmosis concentrate, Dec. 18, 2008, Journal of Cleaner Production, 17, pp. 703-707.*

McDonald, M. R., McClintock, J. B., Amsler, C. D., Rittschoff, D., Angus, R. A., Orihuela, B. & Lutostankski, K., "Effects of Ocean Acidification Over the Life History of the Barnacle Amphibalanus Amphitrite," Marine Ecology Progress Series 385:179-187 (2009).

Ittai Gavrieli Amos Bein, and Aharon Oren, "The Expected Impact of the Peace Conduit Project (The Red Sea-Dead Sea Pipeline) on the Dead Sea," Mitigation and Adaptation Strategies for Global Change, 10:3-22 (2005).

DOW Water Solutions, "Filmtec™ Reverse Osmosis Membranes," Technical Manual, Form No. 609-00071; (2010) pp. 1-180.

DOW Water Solutions, "DOW™ Filmtec™ Membranes—DOW™ Filmtec™ SW3OXLE-440i Seawater Reverse Osmosis Element with iLEC Interlocking Endcaps," Product Information. Form No. 609-03003-1109; (2010) pp. 1-2.

DOW Water Solutions, "DOW™ Filmtec™ Membranes—DOW™ Filmtec™ SW30ULE-440i Seawater Reverse Osmosis Element with iLEC™ Interlocking Endcaps," Product Information, Form No. 609-03004-1109; (2010) pp. 1-2.

DOW Water Solutions, "Filmtec™ Membranes—Filmtec™ XLE-440 Extra Low Energy RO Element," Product Information. Form No. 609-00245-0606; (2010) pp. 1-2.

DOW Water Solutions, "DOW™ Ultrafiltration—High Turbidity and Temperature Fluctuation No Obstacle for DOW™ Ultrafiltration," Case History, Form No. 795-00020-1108; (2010) pp. 1-5.

FAO Corporate Document Repository, Agriculture and Consumer Protection, "Water Quality for Agriculture"; http://www.fao.org/DOCREP/003/T0234E/T0234E05.htm (Feb. 10, 2010) pp. 1-15.

Seung-Hyun Kim, Jong-Sup Yoon, Seockheon Lee, "Utilization of Floc Characteristics for the Evaluation of Seawater Coagulation Process," Desalination and Water Treatment, Civil Engineering Department, Kyungnam University, Masan, Korea, 10 (2009) 95-100. *Presented at EuroMed 2008.

GE Water and Process Technologies, "Cloromat—Solution for Manufacturing Chlor-Alkali Chemicals: Sodium Hypochlorite, Hydrochloric Acid & Caustic Soda," Fact sheet (May 2008) p. 1-4.

GE Power & Water—Water & Process Technologies, "HERO" (2010) pp. 1-2.

ICL, "Harnessing Nature Creating Value," 3rd Annual NASDAQ—TASE Israeli Investor Conference, New York (Sep. 18, 2008) pp. 1-47.

Applied Membranes, Inc., "Water Treatment Guide—Temperature Correction Factor for Reverse Osmosis Membranes," (2007) pp. 1-2.

Nitto Denko and Hydranautics, "Chemical Pretreatment for RO and NF," Technical Application Bulletin No. 111, Revision C (Dec. 2008) pp. 1-16.

Chemical Processign.com, "To Avoid Silica-Scale Problems in Cooling Towers, Plant Personnel Turn to Unconventional Methods," Water Treatment's Gordion Knot; http://www.chemicalprocessing.com/articles/2003/235.html?p.=print; (2003) pp. 1-9.

"Desalination: A National Perspective," Committee on Advancing Desalination Technology, National Research Council , The National Academies—Advisers to the Nation on Science, Engineering, and Medicine (2008) pp. 1-255.

Public Health and the Environment World Health Organization, "Desalination for Safe Water Supply—Guidance for the Health and Environmental Aspects Applicable to Desalination," Geneva (2007) pp. 1-173.

Gerald L. Mackie and Barb Crosbie, "Zebra Mussel Biofouling Control in Cottage and Other Small Volume Water Systems," The Georgian Bay Association (1999) pp. 1-87.

(56) References Cited

OTHER PUBLICATIONS

Ki-Won Baek, Sang-Hun Song, Seok-Hwan Kang, Young-Woo Rhee, Chang-Soo Lee, Bum-Jae Lee, Sam Hudson, and Taek-Sung Hwang, "Adsorption Kinetics of Boron by Anion Exchange Resin in Packed Column Bed," J. Ind. Eng. Chem, vol. 13, No. 3, (2007) 452-456.

EPA Selenium Purification_Scandium (1998) pp. 1-62.

Yoshinobu Tanaka, Reo Ehara, Sigeru Itoi, Totaro Goto, "Ion-exchange membrane electrodialytic salt production using brine discharged from a reverse osmosis seawater desalination plant," Journal of Membrane Science 222 (2003) 71-86.

Reclamation—Managing Water in the West, Desalination and Water Purification Research and Development Program Report No. 135, Pilot Testing of Zero-Discharge Seawater Desalination-Application to Selenium Removal from Irrigation Drainage, U.S. Department of the Interior Bureau of Reclamation, Apr. 2008, pp. 1-37.

Sallie J. Lee, Frank J. Liotta, Steven A. Schwartz, "A New Generation of Gypsum Dispersing Agents," Global Gypsum Conference 2003—Barcelona, Sep. 14-16, 2003, pp. 17.1-17.12.

T. Masuzawa, "Impurities Contained Inside the Crystals of Solar and Vacuum Evaporated Salts," Fifth International Symposium on Salt—Northern Ohio Geological Society, May 29-Jun. 1, 1979, Hamburg, Germany, pp. 463-473.

Seung Joon Kim, Young Geun Lee, Sanghoun Oh, Yun Seok Lee, Young Mi Kim, Moon Gu Jeon, Sangho Lee, In S. Kim, Joon Ha Kim, "Energy saving methodology for the SWRO desalination process: controrl of operating temperature and pressure," Desalination 249 (2009) 260-270.

Peter Eriksson, Markus Kyburz, Wil Pergande, "NF membrane characteristics and evaluation for sea water processing applications," Desalination 184 (2005) 281-294.

EPA Selenium Purification (1991) pp. 1-8.

\* cited by examiner

ZERO DISCHARGE WATER DESALINATION PLANT WITH MINERALS EXTRACTION INTEGRATED WITH NATURAL GAS COMBINED CYCLE POWER GENERATION

CROSS REFERENCE TO RELATED APPLICATIONS

The present application claims priority from U.S. Provisional Patent Application No. 61/305,193, entitled "Zero Discharge Water Desalination Plant With Minerals Extraction Integrated With Natural Gas Combined Cycle Power Generation" and filed on Feb. 17, 2010, which is incorporated by reference herein.

TECHNICAL FIELD

This invention relates generally to methods and systems for desalinating seawater, and, more particularly, to methods and systems for desalinating seawater and recovering minerals from the brine.

BACKGROUND

Conventional Natural Gas Combined Cycle ("NGCC") power plants are sometimes co-located with conventional desalination plants since conventional desalination plants consume significant amounts of power. The conventional NGCC plants typically include a large cooling tower to condense the steam produced in the steam cycle. These conventional NGCC plants that are co-located with the conventional desalination plants require additional capital costs and maintenance costs for the salt water cooling tower. These cooling towers typically generate a concentrated seawater blowdown stream, which can be discharged into the seawater. Once-through seawater has been used; but, this process generates thermal pollution which is detrimental to sea life and is typically not environmentally acceptable.

Typical desalination plant membranes, for example, ultrafiltration ("UF") membranes, nanofiltration ("NF") membranes, and reverse osmosis ("RO") membranes, are operable at seawater temperatures up to about 113° F. As the water temperature increases, the RO differential pressure ("DP") decreases, which results in increasing the membrane capacity. However, the higher water temperature also causes the membranes to have reduced salts rejection. This reduced salt rejection is especially critical for boron since boron is typically the limiting component for desalinated water quality. Boron and chloride removal are especially important for desalinated water that is used for agricultural purposes in arid climates. In arid climates, water evaporation increases and results in increased boron and chloride concentrations within the soil and plants. This boron and chloride build-up reduces crop yields. Thus, the temperature of the seawater should be maintained at appropriate levels to reduce the boron and chloride concentrations in the resulting desalinated water. There is a need in the art for improving the inter-processes between the desalination process and the NGCC process in a cost effective manner when desalination plants are co-located with NGCC plants.

Additionally, United States Gulf Coast ("USGC") desalination plants are subject to membrane fouling due to biological growth from the warm gulf water, and from elevated silt content produced by the Mississippi River and other high turbidity rivers. Thus, these desalination plants typically require pretreatment and/or acidification of the inlet seawater. Although the example provided below is in conjunction with USGC desalination plants, other desalination plants in other regions of the globe have similar issues.

Silica is typically removed from water and brines using lime softening pretreatment. The silica, magnesium, and calcium are precipitated as a sludge at a pH of about ten to about eleven. Lime or caustic typically is used to increase the pH of the intake seawater. While increasing the pH is effective at removing the silica, essentially all of the magnesium, which is a potentially valuable component in seawater, also is removed. Alternatively, the RO membranes can be used to remove silica; however, this results in membrane scaling and frequent replacement of the RO membranes. Anti-sealants can be used in addition to the RO membranes, but this results in additional costs and also adds additional chemicals in the reject brine concentrate that is sent to disposal.

Acidification of the inlet seawater, which involves lowering the pH to about six or below, is desirable for desalination plants that use seawater that includes silica rich fine silt in a colloidal suspension. Acidification causes some of the particles' surface charges to switch from negative to positive, thereby destabilizing the colloidal suspension and enabling effective settling with conventional flocculants, for example, polymers and/or ferric chloride. Carbonate and bicarbonate removal also is facilitated by the acidification of the inlet seawater. The carbonate and bicarbonate are converted to carbon dioxide ("$CO_2$") which can be stripped from the seawater using air. Disinfection also is enhanced at the low pHs. Additionally, hypochlorous or hypobromous acid from chlorination remain in their germicidally effective non-dissociated fog in when the pH is acidic. However, at typical seawater pHs of about eight, these acids dissociate and become less effective.

Unfortunately, acidification of the entire desalination feedwater stream to a pH of about six or less is not cost effective since typical desalination plant yields are about forty to about fifty percent. Acidification involves treatment of over two gallons of seawater for every gallon of resulting desalinated water. In addition, the acidic reject brine concentrate would have to be pH neutralized before it could be discharged back to the body of water, such as a gulf, a sea, or an ocean. Any flocculants, disinfectants, and carbonate deficiencies in the reject brine concentrate also have a potentially negative environmental impact.

The low yield of desalinated water increases the cost of the seawater pretreatment systems and reject brine concentrate disposal. For example, silt removal and biological treatment constitute a large portion of the capital cost for USGC desalination plants. For a typical USGC desalination plant, about forty percent of the cost of the desalination plant is attributed to the seawater intake, pretreatment, and concentrate disposal.

The low yield of desalinated water from the RO membranes also requires pressure recovery devices for high efficiency operation. These devices either pressurize the RO feedwater or produce electricity from the high pressure non-permeate stream, which is about 1000 pounds per square inch gage ("psig"). Although these devices allow a high efficiency, they increase the capital cost of the desalination plant and incur additional maintenance costs.

GE Water offers a high efficiency reverse osmosis ("HERO") process that can achieve about 90-98% recovery of desalinated water. The system uses two pass reverse osmosis membranes operated at a pH of about 10-10.5. The high pH allows greater than about 99.4 percent boron rejection, greater than about 99.97 percent silica rejection, and eliminates bio-fouling. However, this process requires cation pretreatment, or softening, to reduce hardness to less than about 0.1 parts per million ("ppm"), degasification of $CO_2$ to less than about 10 ppm, and caustic addition to raise the pH to above about ten. In addition, the large backwash stream from the cation pretreatment, which includes calcium and magnesium purge, and the reverse osmosis non-permeate stream, which includes sodium, chloride, bromide, and boron purge, require disposal. The high cost of pretreatment and concentrated waste streams typically make this process uneconomical for seawater desalination. There is a need in the art for improving the pretreatment process for seawater intake streams that are used in desalination plants.

There are some regions, for example the Middle East, India, California, and Florida, in the world that have issues with water availability. The Middle East is one of the most arid regions in the world and it has been predicted that regional per capita water availability will fall by about half by 2050, with serious consequences for the region's already stressed aquifers and natural hydrological systems. Currently, the Middle East has about sixty percent of the world's 7500 desalination plants, which produces about half of the entire region's drinking water. These desalination plants use the available seawater to produce desalinated water that may be used for drinking.

Most of these regional countries in the Middle East have coastlines that provide easy access to unlimited supplies of seawater. Desalination plants currently use membranes, such as an ultrafiltration ("UF"), a nanofiltration ("NF"), and a reverse osmosis ("RO"), and thermal separation units, such as a multistage flash ("MSF") and a mechanical vapor recompression ("MVR"), to extract desalinated water from seawater. The hot residue brine, which is an environmentally harmful saline liquid, is then returned to the sea. In addition, once through cooling water is used for overall heat rejection from the thermal processes and also is returned to the sea. These discharges that are sent back to the sea result in increased salinity and temperature in a large region around the desalination outfall. The increased salinity and temperature create environmental issues and limits the amount of desalination capacity that can be installed within a given region. These issues are especially true for the Red Sea and the Arabian Gulf where there is rapid growth in desalination capacity. The limited circulation, lack of fresh water inflow, and large natural evaporation rate due to the increased water temperatures create elevated salinity, about 4.5% versus 3.5% total dissolved solids ("TDS"), in these seas.

The brines discharged back into the sea impact marine ecosystems. Desalination plants along the Arabian Gulf treat in excess of 25 million cubic meters per day of seawater to produce up to 10 million cubic meters per day of drinking water, with the difference being returned to the sea as hot and concentrated brine. There is currently no binding legislation in the region that mandates quality control on effluents and no technology is currently available to treat these massive discharges.

Concerns have arisen about the long-term impact of desalination in the waters of the Arabian Gulf by using current desalination technology. Water can only be desalinated two to five times and it takes up to 200 years for the whole Arabian Gulf to be renewed by natural currents from the Indian Ocean.

In view of the foregoing discussion, need is apparent in the art for reducing and/or eliminating the brine stream being recycled into the sea. Additionally, a need is apparent for increasing the efficiency of producing desalinated water from seawater. Also, there exists the need for recovering the minerals during the desalination process in an economic and reusable manner. Further, there exists a need for utilizing any by-products formed during the desalination process. Furthermore, there is a need in the art for improving the inter-processes between the desalination process and the NGCC process when desalination plants are co-located with NGCC plants. Moreover, there is a need in the art for improving the pretreatment process for seawater intake streams that are used in desalination plants. A technology addressing one or more such needs, or some other related shortcoming in the field, would benefit desalination processes. One or more of these technologies are included within the current embodiments of the invention.

BRIEF DESCRIPTION OF THE DRAWINGS

The foregoing and other features and aspects of the invention may be best understood with reference to the following description of certain exemplary embodiments of the invention, when read in conjunction with the accompanying drawings, wherein.

Figure 1:
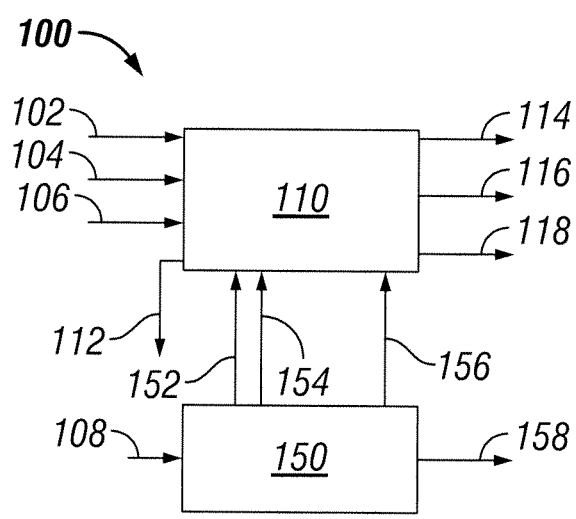
FIG. 1 shows a block diagram of an integrated desalination and natural gas combined cycle power unit in accordance with an exemplary embodiment of the present invention.

The drawings illustrate only exemplary embodiments of the invention and are therefore not to be considered limiting of its scope, as the invention may admit to other equally effective embodiments.

BRIEF DESCRIPTION OF EXEMPLARY EMBODIMENTS

The application is directed to methods and systems for desalinating seawater. In particular, the application is directed to methods and systems for desalinating seawater and recovering minerals from the brine. Some embodiments of the present invention include zero discharge of waste streams. Some embodiments of the present invention include an optional natural gas combined cycle power unit that is integrated with the desalination unit. Also, although specific flowrates, pHs, temperatures, and other operating parameters have been provided with respect to certain areas of operation in accordance with an operating example, alternative operating parameters outside the specific example are within the scope of the embodiments of the present invention. The invention may be better understood by reading the following description of non-limiting, exemplary embodiments with reference to the attached drawings, wherein like parts of each of the figures are identified by the same reference characters, and which are briefly described as follows.

FIG. 1 shows a block diagram of an integrated desalination and natural gas combined cycle power unit 100 in accordance with an exemplary embodiment of the present invention. Referring to FIG. 1, the integrated desalination and natural gas combined cycle power unit 100 includes a desalination and minerals extraction process unit 110 and a natural gas combined cycle power unit 150. In certain exemplary embodiments, however, the natural gas combined cycle power unit 150 is optional and the power and/or the chilled water used by certain equipment within the desalination and minerals extraction process unit 110 is supplied from another process unit (not shown) or is purchased for use within the desalination and minerals extraction process unit 110. In other exemplary embodiments, other processes, such as a gasification unit (not shown), can be integrated with at least the desalination and minerals extraction process unit 110 without departing from the scope and spirit of the exemplary embodiment.

A scrap iron or iron oxide feed stream 102, a dolime feed stream 104, and a seawater feed stream 106 are fed into the desalination and minerals extraction process unit 110. The seawater feed stream 106 has a high turbidity, is biologically active, and includes a silica rich silt. According to one exemplary embodiment, the seawater feed stream 106 has a flowrate approximately thirty million gallons per day ("MGD"). The scrap iron or iron oxide feed stream 102 includes iron and assists the silica rich silt within the seawater feed stream 106 to rapidly flocculate and settle out of the seawater. Additionally, the iron within the scrap iron or iron oxide feed stream 102 polymerizes the reactive silica, thereby leaving the seawater essentially free of reactive silica. According to one exemplary embodiment, the scrap iron feed stream, or iron oxide (red mud) feed stream, has a flowrate about one to about five standard tons per day ("sTPD"). The dolime feed stream 104 is used for minerals recovery, which includes precipitating magnesium hydroxide from solution. The dolime feed stream 104 has a flowrate about 600 sTPD according to one exemplary embodiment.

The desalination and minerals extraction process unit 110 processes the scrap iron or iron oxide feed stream 102, the dolime feed stream 104, and the seawater feed stream 106 to produce a iron rich stream 112, a desalination water stream 114, a demineralized water stream 116, and an industrial minerals stream 118. The iron rich stream 112 is sold as an iron rich soil amendment. Alternatively, the iron rich stream 112 is transported to a gasification unit where the iron rich stream 112 is used as a fluxant to lower the melting point of the slag within the gasifier (not shown). According to one exemplary embodiment, the iron rich stream 112 has a flowrate about ten sTPD. The desalination and minerals extraction process unit 110 produces either the desalination water stream 114 or the demineralized water stream 116 or both streams 114 and 116 depending upon the operator's desires. According to one exemplary embodiment and based upon the flowrates of the inlet feed streams 102, 104, and 106, the combined flowrate for the desalination water stream 114 and the demineralized water stream 116 is about thirty MGD. The industrial minerals stream 118 includes minerals selected from at least one of high purity gypsum, high purity magnesium hydroxide or magnesium oxide, calcium chloride, high purity salt, high purity potassium chloride, high purity bromine, high purity boric acid, iron chloride, hydrochloric acid, chlorine, sodium hydroxide, and sodium hypochlorite. According to some exemplary embodiments, at least a portion of the industrial minerals stream 118 is valuable minerals that are commercially sold, and the remaining portion of the industrial minerals stream 118 is reused within the desalination and minerals extraction process unit 110 or any other integrated unit. According to one exemplary embodiment and based upon the flowrates of the inlet feed streams 102, 104, and 106, about 500 sTPD of high purity gypsum is produced, about 500 sTPD of high purity magnesium hydroxide or magnesium oxide is produced, about 450 sTPD of calcium chloride is produced, about 3000 sTPD of high purity salt is produced, about one hundred sTPD of high purity potassium chloride is produced, about eight sTPD of high purity bromine is produced, and about two sTPD of high purity boric acid is produced.

A natural gas stream 108 is fed into the natural gas combined cycle power unit 150. According to one exemplary embodiment, the natural gas stream 108 has a flowrate about twelve million ("MM") standard cubic feet per day ("SCFD"). The natural gas combined cycle power unit 150 processes the natural gas stream 108 and produces a chilled water stream 152 using one or more thermal energy storage chilled water tanks (not shown), which is described in further detail below with respect to FIG. 8. The chilled water stream 152 is used to provide cooling to several equipment that are part of the desalination and minerals extraction process unit 110. The natural gas combined cycle power unit 150 also produces heat 154 that is used within the desalination and minerals extraction process unit 110. Heat 154 is typically used to increase the temperature of one or more desalination process streams. Additionally, the natural gas combined cycle power unit 150 produces off-peak power 156 that is used to power certain equipment during off-peak pricing periods, such as pumps and compressors, within the desalination and minerals extraction process unit 110. Moreover, the natural gas combined cycle power unit 150 produces peak power 158 during peak pricing periods that is typically sold. Peak power 158 is more valuable than off-peak power 156 and thus is typically sold, rather than used within internal processes. However, at times, some of the peak power 158 can be used to provide power to certain equipment that is operated continuously.

The thermal energy storage chilled water tank allows the natural gas combined cycle power unit 150 to maximize the export of power during peak price periods (peak power) and minimize the export of power during off-peak price periods (off-peak power). As used herein, the term "peak price period" refers to a time period, typically mid-day, during which power demand is at a maximum and the market price of the power is at a premium. As used herein, the term "off-peak price period" refers to a time period, typically night, during which power demand is at a minimum and the market price of the power is the lowest.

Figure 2:
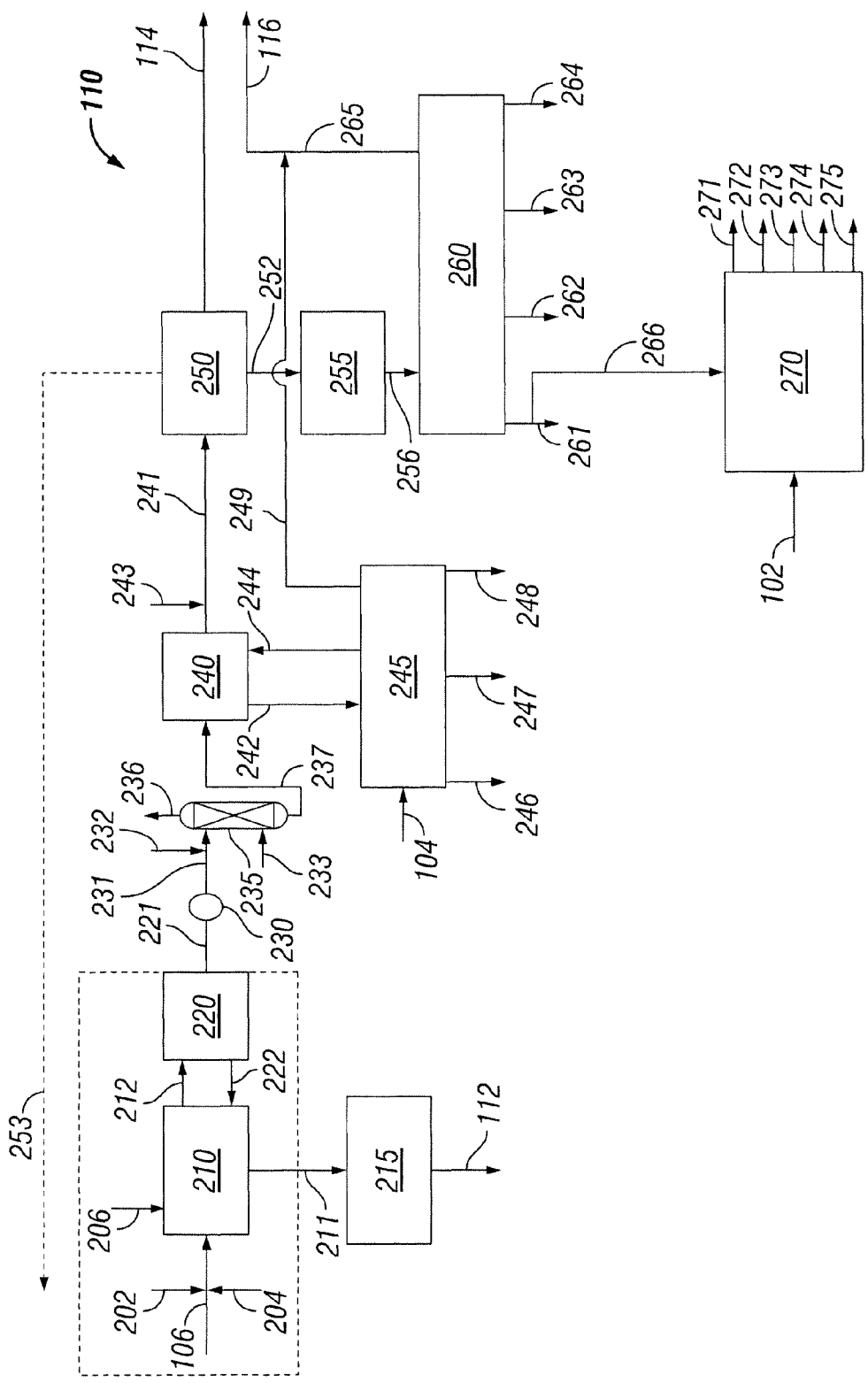
FIG. 2 shows a simplified block diagram of a desalination and minerals extraction process unit of FIG. 1 in accordance with an exemplary embodiment of the present invention.

FIG. 2 shows a simplified block diagram of the desalination and minerals extraction process unit 110 of FIG. 1 in accordance with an exemplary embodiment of the present invention. As shown in the simplified block diagram of FIG. 2, the desalination and minerals extraction process unit 110 includes a settler/filter 210, a pelletizer/dryer 215, an ultrafiltration ("UF") membrane 220, an steam turbine ("ST") condenser 230, an air stripper 235, a nanofiltration ("NF") membrane 240, a first minerals recovery unit 245, a high efficiency reverse osmosis ("RO") unit 250, a brine tank 255, a second minerals recovery unit 260, and a chloralkali unit 270.

Referring to FIG. 2, the seawater feed stream 106 is mixed with a sodium hypochlorite stream 202, or chlorine stream (not shown), and a hydrochloric acid stream 204, or sulfuric acid stream (not shown). This mixing of the seawater feed stream 106 with the sodium hypochlorite stream 202 and the hydrochloric acid stream 204 reduces the pH of the seawater feed stream 106 to less than about 6.5 and disinfects the seawater feed stream 106, thereby eliminating or reducing biological growth. The low pH, or acidic pH, inhibits barnacle and zebra mussel growth since the low pH causes dissolution of the calcium carbonate shells. The acidic pH also promotes hypochlorous acid and hypobromous acid formation which increases the biocide effectiveness of the chlorine or hypochlorite. This allows the chlorine or hypochlorite to be dosed at periodic intervals, for example, offline cleaning and/or shock treatments, thereby minimizing the production of organic fragments which can cause biofilm fouling in the downstream equipment. According to one exemplary embodiment, the flowrate of the seawater feed stream 106 is about thirty MGD.

A ferric chloride stream 206, a waste gypsum slurry stream (not shown), and an insoluble dolime slaking stream (not shown) are mixed with the acidified and disinfected seawater feed stream 102, which is then routed to the settler/filter 210. At least a portion of the ferric chloride stream 206 is produced from the scrap iron or iron oxide feed stream 102 in certain exemplary embodiments. Alternatively or additionally, at least a portion of the ferric chloride feed stream 206 is produced from the chloralkali unit 270. In some exemplary embodiments, the settler/filter 210 includes a ballasted settler.

Within the settler/filter 210, the combination of the low pH, the ferric chloride, the calcium sulfate, and sand ballast causes the silica rich silt within the seawater to rapidly flocculate and settle out of the seawater. Additionally, the iron polymerizes the reactive silica, thereby leaving the seawater essentially free of reactive silica. In some exemplary embodiments, an additional acid stream (not shown) is added to the settler/filter 210 to maintain the pH within the settler/filter 210 below about 6.5. The settler/filter 210 produces a washed filter cake stream 211 and a settler overflow stream 212.

The washed filter cake stream 211 is routed to the pelletizer/dryer 215 where heat from the natural gas combined cycle power unit 150 (FIG. 1) is used to dry the filter cake stream 211. The heat provided from the natural gas combined cycle power unit 150 (FIG. 1) is in the form of either low pressure steam, hot exhaust gas, or power from a vapor recompression dryer. The pelletizer/dryer 215 produces the iron rich stream 112, which includes a dried and pelletized filter cake. The iron rich stream 112 is sold as an iron rich soil amendment according to one exemplary embodiment. In an alternative exemplary embodiment, however, the iron rich stream 112 is transported to a gasification unit, where the iron rich stream 112 is used as a fluxant to lower the melting point of the slag in the gasifier. In some exemplary embodiments, a combination of selling and using the iron rich stream 112 is performed. According to an exemplary embodiment and based upon a thirty MGD flowrate of seawater feed stream 106, the flowrate of the iron rich stream 112 is about ten sTPD.

The settler overflow stream 212 is routed to the UF membrane 220 where residual solids and polymerized silica are removed, along with most of the remaining pathogens, algae, and/or other biological organisms. Within the UF membrane 220, the settler overflow stream 212 is separated into a UF permeate stream 221 and a UF non-permeate stream 222. The UF permeate stream 221, which has had essentially all the suspended solids, bacteria, viruses, and microbes removed, exits the UF membrane 220 and flows to at least the ST condenser 230, which is also used within the natural gas combined cycle power unit 150 (FIG. 1). In some exemplary embodiments, the UF permeate stream 221 also flows to one or more closed-loop utility cooling water exchangers (not shown). The UF non-permeate stream 222, which contains essentially all the suspended solids, viruses, and microbes, exits the UF membrane 220 and is recycled back to the settler/filter 210.

The UF permeate stream 221 has a temperature of about sixty-five to about eighty-five degrees Fahrenheit and enters the ST condenser 230 where it is heated to produce a ST condenser preheated seawater stream 231. The ST condenser preheated seawater stream 231 exits the ST condenser 230 at a temperature of about eighty-five to about 105 degrees Fahrenheit. The ST condenser preheated seawater stream 231 is then acidified with a hydrochloric acid stream 232, or a sulfuric acid stream (not shown), to a pH less than about four. This pH of about four or less converts essentially all of the carbonate and bicarbonate to free carbon dioxide. The acidified ST condenser preheated seawater stream 231 enters the air stripper 235.

The acidified ST condenser preheated seawater stream 231 and an air stream 233 enter the air stripper 235. According to an exemplary embodiment, the air stripper 235 operates at a pH of about four and a temperature of about ninety-seven degrees Fahrenheit. In some exemplary embodiments, the temperature ranges from about ninety-five degrees Fahrenheit to about 100 degrees Fahrenheit. In certain exemplary embodiments, the air stream 233 is untreated. In some exemplary embodiments, the air stream 233 is treated to remove some or all of the carbon dioxide from the air stream 233. One example for treating the air stream 233 involves using chillers and molecular sieves. Alternatively, a nitrogen stream (not shown) or waste nitrogen stream (not shown) from an air separation unit (not shown), which is substantially free from carbon dioxide, is used in lieu of the air stream 233. Within the air stripper 235, the air stream 233 strips the acidified ST condenser preheated seawater stream 231 to remove essentially all of the carbon dioxide from the acidified ST condenser preheated seawater stream 231. The air stripper 235 produces a carbon dioxide stream 236, which is used in another process or is allowed to be discharged into the environment, and a air stripper discharge stream 237. The air stripper discharge stream 237 is routed to the NF membrane 240. According to an exemplary embodiment and based upon a thirty MGD flowrate of seawater feed stream 106, the flowrate of the air stripper discharge stream 237 is about thirty MGD.

Within the NF membrane 240, the air stripper discharge stream 237 is separated into an NF permeate stream 241 and an NF non-permeate stream 242. According to an exemplary embodiment, the NF membrane operates at a pH of about six and a temperature of about ninety-seven degrees Fahrenheit. The NF permeate stream 241, which has had essentially all of the bacteria, sulfate, calcium, magnesium, residual iron, and other trace divalent metals in the seawater removed, exits the NF membrane 240 and flows toward the high efficiency RO unit 250. The NF non-permeate stream 242, which contains essentially all the sulfate, calcium, magnesium, residual iron, and other trace divalent metals in the seawater, exits the first NF membrane 240 and flows to the first minerals recovery unit 245.

The NF non-permeate stream 242 and the dolime feed stream 104 flow into the first minerals recovery unit 245 and produce a high purity gypsum stream 246, a high purity magnesium hydroxide stream 247, a calcium chloride stream 248, a first minerals recovery demineralized water stream 249, and a first minerals recovery recycle stream 244. According to an exemplary embodiment and based upon a thirty MGD flowrate of seawater feed stream 106, the flowrate of the dolime feed stream 104 is about 600 sTPD. The high purity gypsum stream 246 includes a gypsum filter cake, which is sold as a byproduct. The high purity magnesium hydroxide stream 247 is sold as a byproduct. Alternatively, the high purity magnesium hydroxide stream 247 is calcined and sold as magnesium oxide. The calcium chloride stream 248 also is sold. The first minerals recovery demineralized water stream 249 is a high purity condensate stream. The first minerals recovery recycle stream 244 is recycled back to the NF membrane 240. According to an exemplary embodiment and based upon a thirty MGD flowrate of seawater feed stream 106, the flowrate of the high purity gypsum stream 246 is about 500 sTPD, the flowrate of the high purity magnesium hydroxide stream 247 is about 500 sTPD, and the flowrate of the calcium chloride stream 248 is about 450 sTPD.

The softened NF permeate stream 241 is mixed with a high purity caustic stream 243, thereby increasing the pH of the NF permeate stream 241 from a pH of less than about six to a pH of about ten to eleven. The increased pH converts boron to borate and any residual silica to silicate. The softened NF permeate stream 241 enters the high efficiency RO unit 250. According to an exemplary embodiment and based upon a thirty MGD flowrate of seawater feed stream 106, the flowrate of the NF permeate stream 241 is about twenty-eight MGD. Within the RO unit 250, the softened NF permeate stream 241 is separated into the desalination water stream 114 and a RO non-permeate stream 252. According to an exemplary embodiment, the RO unit 250 operates at a pH of about ten and a temperature of about ninety-seven degrees Fahrenheit. The desalination water stream 114, which has had essentially all of the salt, boron, and other minerals removed, exits the RO unit 250 and is now desalinated water, which can be used as potable water. According to an exemplary embodiment and based upon a thirty MGD flowrate of seawater feed stream 106, the flowrate of the desalination water stream 114 is about twenty MGD. The RO non-permeate stream 252, which includes essentially all the salt and much of the boron, exits the RO unit 250 and flows to the brine tank 255.

The brine tank 255 stores the RO non-permeate stream 252 and discharges a brine tank discharge stream 256 into the second minerals recovery unit 260. The second minerals recover unit 260 produces a high purity salt stream 261, a high purity potassium chloride stream 262, a high purity bromine stream 263, a high purity boric acid stream 264, and a second minerals recovery demineralized water stream 265. In some exemplary embodiment, at least a portion of the high purity salt stream 261 is routed to the chloralkali unit 270 via a chloralkali unit feed stream 266. A large portion or all of the high purity salt stream 261 is sold as a byproduct. The high purity potassium chloride stream 262 is sold as a byproduct salt or solution. The high purity bromine stream 263 is sold as a byproduct liquid. The high purity boric acid stream 264 also is sold as a byproduct filter cake or as a dried product. The second minerals recovery demineralized water stream 265 is a high purity condensate stream that is combined with the first minerals recovery demineralized water stream 249 to form the demineralized water stream 116 in certain exemplary embodiments. According to an exemplary embodiment and based upon a thirty MGD flowrate of seawater feed stream 106, the flowrate of the high purity salt stream 261 is about 3000 sTPD, the flowrate of the high purity potassium chloride stream 262 is about 100 sTPD, the flowrate of the high purity bromine stream 263 is about eight sTPD, and the flowrate of the high purity boric acid stream 264 is about two sTPD. Additionally, according to an exemplary embodiment and based upon a thirty MGD flowrate of seawater feed stream 106, the combined flowrate of the first minerals recovery demineralized water stream 249 and the second minerals recovery demineralized water stream 265 is about ten MGD.

The chloralkali unit feed stream 266 and a iron oxide stream 102, or scrap iron stream, flow into the chloralkali unit 270 and produce an iron chloride stream 271, a hydrochloric acid stream 272, a chlorine stream 273, a sodium hydroxide stream 274, and a sodium hypochlorite stream 275. According to some exemplary embodiments, at least a portion of at least one of the iron chloride stream 271, the hydrochloric acid stream 272, the chlorine stream 273, the sodium hydroxide stream 274, and the sodium hypochlorite stream 275 is reused within the integrated desalination and natural gas combined cycle power unit 100 (FIG. 1). In another exemplary embodiment, at least a portion of at least one of the iron chloride stream 271, the hydrochloric acid stream 272, the chlorine stream 273, the sodium hydroxide stream 274, and the sodium hypochlorite stream 275 is sold to market.

In another exemplary embodiment of the present invention, the brine tank 255, the second minerals recovery unit 260, and the chloralkali unit 270 are eliminated so that the RO non-permeate stream 252 is discharge back to a body of water, for example, an ocean, a sea, a lake, or any other body of water or waste pond. Thus, at least the high purity salt stream 261, the high purity potassium chloride stream 262, the high purity bromine stream 263, the high purity boric acid stream 264, and the second minerals recovery demineralized water stream 265 are not produced.

In yet another exemplary embodiment of the present invention, the first minerals recovery unit 245 is eliminated so that the NF non-permeate stream 242 is discharge back to a body of water, for example, an ocean, a sea, a lake, or any other body of water or waste pond. Thus, at least the high purity gypsum stream 246, the high purity magnesium hydroxide stream 247, the calcium chloride stream 248, and the first minerals recovery demineralized water stream 249 is not produced.

In yet another exemplary embodiment of the present invention, the brine tank 255, the second minerals recovery unit 260, and the chloralkali unit 270 are eliminated and replaced with the NF membrane 240 and the first minerals recovery unit 245. Thus, the air stripper discharge stream 237 from the air stripper 235 is routed directly to the RO unit 250. Additionally, the RO non-permeate stream 252 from the RO unit 250 is routed to the NF membrane 240; and, the NF non-permeate stream 242 from the NF membrane 240 is routed to the first minerals recovery unit 245. Thus, in this alternative exemplary embodiment, the high purity gypsum stream 246, the high purity magnesium hydroxide stream 247, the calcium chloride stream 248, and the first minerals recovery demineralized water stream 249 is produced, while the high purity salt stream 261, the high purity potassium chloride stream 262, the high purity bromine stream 263, the high purity boric acid stream 264, and the second minerals recovery demineralized water stream 265 are not produced.

Figure 3:
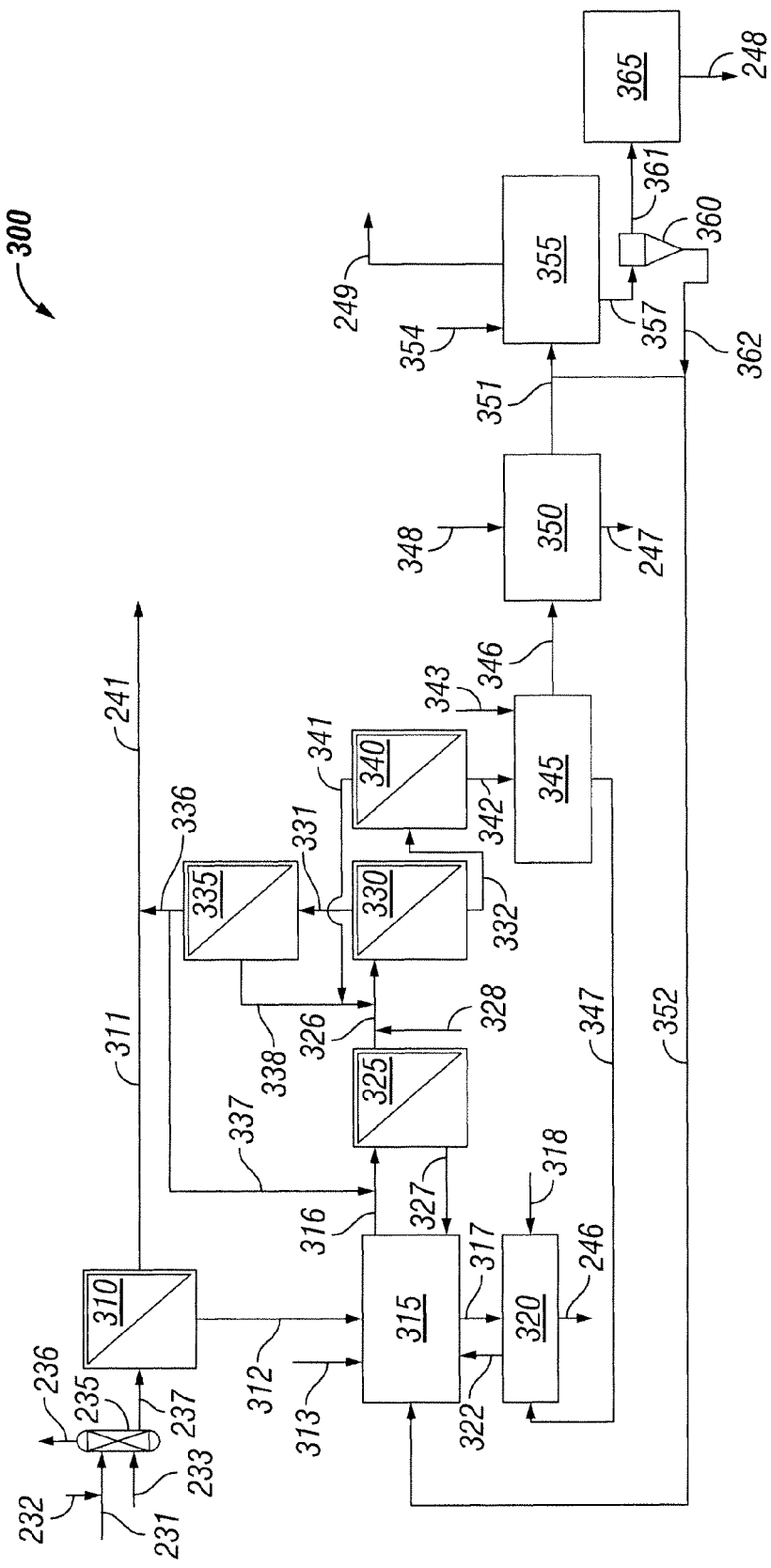
FIG. 3 shows a simplified flowchart of a nanofiltration pretreatment section of the desalination and minerals extraction process unit of FIG. 2 in accordance with an exemplary embodiment of the present invention.

FIG. 3 shows a simplified flowchart of a nanofiltration pretreatment section 300 of the desalination and minerals extraction process unit 110 of FIG. 2 in accordance with an exemplary embodiment of the present invention. For convenience and perspective for where the nanofiltration pretreatment section 300 is positioned, the ST condenser preheated seawater stream 231, the hydrochloric acid stream 232, the air stripper 235, the air stream 233, the carbon dioxide stream 236, and the air stripper discharge stream 237 are shown in FIG. 3 even though they are not part of the nanofiltration pretreatment section 300. The nanofiltration pretreatment section 300 is represented by the NF membrane 240 (FIG. 2), the first minerals recovery unit 245 (FIG. 2), and their associated streams. Referring to FIG. 3, the nanofiltration pretreatment section 300 includes a primary NF membrane 310, a primary NF settler hydroclone 315, a primary NF filter 320, a UF membrane 325, a first secondary NF membrane 330, a second secondary NF membrane 335, a third secondary NF membrane 340, a secondary NF settler hydroclone 345, a secondary NF settler filter 350, a secondary NF evaporator 355, a secondary NF hydroclone 360, and a secondary NF flaker/pelletizer 365.

The air stripper discharge stream 237 enters the primary NF membrane 310 where the air stripper discharge stream 237 is separated into a primary NF permeate stream 311 and a primary NF non-permeate stream 312. According to an exemplary embodiment, the primary NF membrane 310 operates at a pH of about five to about six. At this pH, the primary NF membrane 310 is negatively charged, thereby maximizing sulfate rejection. The primary NF membrane 310 removes most of the sulfate, calcium, magnesium, residual iron, residual bacteria, and other trace divalent metals from the air stripper discharge stream 237. The primary NF permeate stream 311, which has had essentially all of the sulfate, calcium, magnesium, residual iron, and other trace divalent metals in the seawater removed, exits the primary NF membrane 310 and flows toward the high efficiency RO unit 250 (FIG. 2), as previously described. The primary NF non-permeate stream 312, which includes essentially all the sulfate, calcium, magnesium, residual iron, and other trace divalent metals in the seawater, exits the primary NF membrane 310 and flows to the primary NF settler hydroclone 315. According to one exemplary embodiment, the primary NF permeate stream 311 has about eighty percent of the flowrate of the air stripper discharge stream 237, while the primary NF non-permeate stream 312 has about twenty percent of the flowrate of the air stripper discharge stream 237.

The primary NF non-permeate stream 312, a lime/dolime stream 313, a calcium chloride recycle stream 352 which is discussed in further detail below, a UF non-permeate stream 327 which is discussed in further detail below, and a primary NF filter recycle stream 320 which is described in further detail below, are mixed together and routed to the primary NF settler hydroclone 315. In one exemplary embodiment, the pH of the calcium chloride recycle stream 352 is about nine to about ten. The calcium combines with the sulfate in the primary NF settler hydroclone 315 producing a high purity calcium sulfate, or gypsum, precipitate. The excess calcium from the calcium chloride recycle stream 352 causes essentially all of the sulfate, about greater than ninety-five percent, to be removed from the primary NF non-permeate stream 312. The primary NF settler hydroclone 315 produces a primary NF settler hydroclone bottoms stream 317 and a primary NF settler hydroclone overflow stream 316. In the settler hydroclone units 315 and 345, the hydroclones 315 and 345 are used to extract the course solids fraction from the settler bottoms as a bottoms discharge stream and recycle the fines back to the settlers.

The primary NF settler hydroclone bottoms stream 317 is routed to the primary NF filter 320, where the primary NF settler hydroclone bottoms stream 317 is mixed with a gypsum slurry stream 347, which is described in further detail below. In one exemplary embodiment, the pH of the gypsum slurry stream 347 is about eight to about nine. The mixed primary NF settler hydroclone bottoms stream 317 and gypsum slurry stream 347 is filtered and washed with a desalinated water stream 318. The primary NF filter 320 produces the high purity gypsum stream 246, which is a gypsum filter cake, and the primary NF filter recycle stream 322. The high purity gypsum stream 246 is sold as a byproduct according to one exemplary embodiment. As previously mentioned, the primary NF filter recycle stream 322 is sent back to the primary NF settler hydroclone 315 for further processing.

The primary NF settler hydroclone overflow stream 316 is mixed with a portion of a second secondary NF permeate stream 337, which is described in further detail below, and routed to the UF membrane 325 where any trace solids within the primary NF settler hydroclone overflow stream 316 and the portion of the second secondary NF permeate stream 337 is removed. According to one exemplary embodiment, the UF membrane 325 operates at a pH of about six to about nine. The UF membrane 325 separates the primary NF settler hydroclone overflow stream 316 and the portion of the second secondary NF permeate stream 337 into a UF permeate stream 326 and the UF non-permeate stream 327 which, as previously mentioned, is recycled back to the primary NF settler hydroclone 315. The solids free UF permeate stream 326 is routed to the first secondary NF membrane 330.

The UF permeate stream 326 is mixed with a hydrochloric acid stream 328 to lower the pH to about three to about four. At this pH, the first secondary NF membrane 330 is positively charged, thereby maximizing the calcium and magnesium rejection. Additionally, the UF permeate stream 326 is mixed with a second secondary NF non-permeate stream 338 and a third NF permeate stream 341 prior to entering the first secondary NF membrane 330. The first secondary NF membrane 330 separates the combined UF permeate stream 326, the second secondary NF non-permeate stream 338, and the third NF permeate stream 341 into a first secondary NF permeate stream 331 and a first secondary NF non-permeate stream 332. According to one exemplary embodiment, the first secondary NF membrane operates at a pH of about three to about four. The first secondary NF membrane 330 removes the calcium and magnesium chloride from the combined UF permeate stream 326, the second secondary NF non-permeate stream 338, and the third NF permeate stream 341 and allows the calcium and the magnesium chloride to flow with the first secondary NF non-permeate stream 332.

The first secondary NF permeate stream 331 is routed to the second secondary NF membrane 335, which separates the first secondary NF permeate stream 331 into a second secondary NF permeate stream 336 and the second secondary NF non-permeate stream 338. The second secondary NF membrane 335 further removes the calcium and magnesium chloride from the first secondary NF permeate stream 331 and allows the calcium and the magnesium chloride to flow with the second secondary NF non-permeate stream 338. As previously mentioned, the second secondary NF non-permeate stream 338 flows back into the first secondary NF membrane 330. As previously mentioned, a portion of the second secondary NF permeate stream 337 is recycled back to the UF membrane 325. The remaining portion of the second secondary NF permeate stream 336 is combined with the primary NF permeate stream 311 and flows toward the RO unit 250 (FIG. 2) via the NF permeate stream 241. According to one exemplary embodiment, the remaining portion of the second secondary NF permeate stream 336 has about eighteen percent of the flowrate of the air stripper discharge stream 237.

The first secondary NF non-permeate stream 332 flows to the third secondary NF membrane 340, which separates the first secondary NF non-permeate stream 332 into the third secondary NF permeate stream 341 and a third secondary NF non-permeate stream 342. The third secondary NF membrane 340 further removes the calcium and magnesium chloride from the first secondary NF non-permeate stream 332 and allows the calcium and the magnesium chloride to flow with the third secondary NF non-permeate stream 342. As previously mentioned, the third secondary NF permeate stream 341 flows back into the first secondary NF membrane 330 for further processing. In summary, the collective function of the first, second, and third secondary NF membranes 335, 340, and 335 is to: a) concentrate the calcium and magnesium chloride in the overall secondary NF non-permeate stream, or the third secondary NF non-permeate stream 342, and b) produce a low hardness overall secondary NF permeate stream (the remaining portion of the second secondary NF permeate stream 336) which can be combined with the primary NF permeate stream 311.

The third secondary NF non-permeate stream 342 is routed to the secondary NF settler hydroclone 345, which operates at a pH of about eight to about nine through lime or dolime addition. The calcium and residual sulfate in the NF non-permeate stream 342 react forming additional gypsum. The secondary NF settler hydroclone 345 produces the gypsum slurry stream 347 which, as previously mentioned, is recycled to the primary NF filter 320 and a secondary NF settler hydroclone overflow stream 346, which is concentrated calcium and magnesium chloride and essentially sulfate free. According to one exemplary embodiment, the secondary NF settler hydroclone overflow stream 346 is at a pH of about eight to about nine and includes about ten weight percent magnesium chloride.

The secondary NF settler hydroclone overflow stream 346 is mixed with a high purity slaked dolime slurry stream 343 or 348 and is routed to the secondary NF settler filter 350. Within the secondary NF settler filter 350, the dolime precipitates the magnesium as magnesium hydroxide while leaving the calcium chloride in solution. The magnesium hydroxide is then filtered from the solution and subsequently washed. The secondary NF settler filter 350 produces the high purity magnesium hydroxide stream 247. Alternatively, the high purity magnesium hydroxide stream 247 is calcined and sold as magnesium oxide. Additionally, the secondary NF settler filter 350 produces a secondary NF settler filter overflow stream 351 that is routed to the secondary NF evaporator 355. However, a portion of the secondary NF settler filter overflow stream 351 is recycled back to the primary NF settler hydroclone 315 via the calcium chloride recycle stream 352. According to one exemplary embodiment, the secondary NF settler filter overflow stream 351 has a pH of about ten and about seventeen weight percent calcium chloride.

The secondary NF evaporator 355 receives the secondary NF settler filter overflow stream 351 and a hydrochloric acid stream 354 and separates streams 351 and 354 into the first minerals recovery demineralized water stream 249 and a secondary NF evaporator bottoms stream 357. The secondary NF evaporator 355 concentrates the calcium chloride to over seventy-five weight percent in the secondary NF evaporator bottoms stream 357 and produces a high purity condensate, which makes up the first minerals recovery demineralized water stream 249. The first minerals recovery demineralized water stream 249 has about two percent of the flowrate of the air stripper discharge stream 237. The secondary NF evaporator bottoms stream 357 is routed to the secondary NF hydroclone 360 which produces a secondary NF hydroclone overflow stream 361 and a secondary NF hydroclone sodium chloride slurry stream 362. The secondary NF hydroclone sodium chloride slurry stream 362 is recycled back to the primary NF settler hydroclone 315 where it is used to precipitate sulfate as gypsum. The secondary NF hydroclone overflow stream 361 is routed to the secondary NF flaker/pelletizer 365, where the secondary NF hydroclone overflow stream 361 is formed into the calcium chloride stream 248. The calcium chloride stream 248 is sold to market as calcium chloride flakes or pellets.

In another exemplary embodiment, a centrifuge (not shown) is used in lieu of the secondary NF hydroclone 360. The sodium chloride salt is removed and washed in the centrifuge producing high purity byproduct sodium chloride which is sold. A filtrate stream 361 from the centrifuge is routed to the secondary NF flaker/pelletizer. The wash water stream (not shown) is recycled to the secondary NF evaporator 355.

Figure 4:
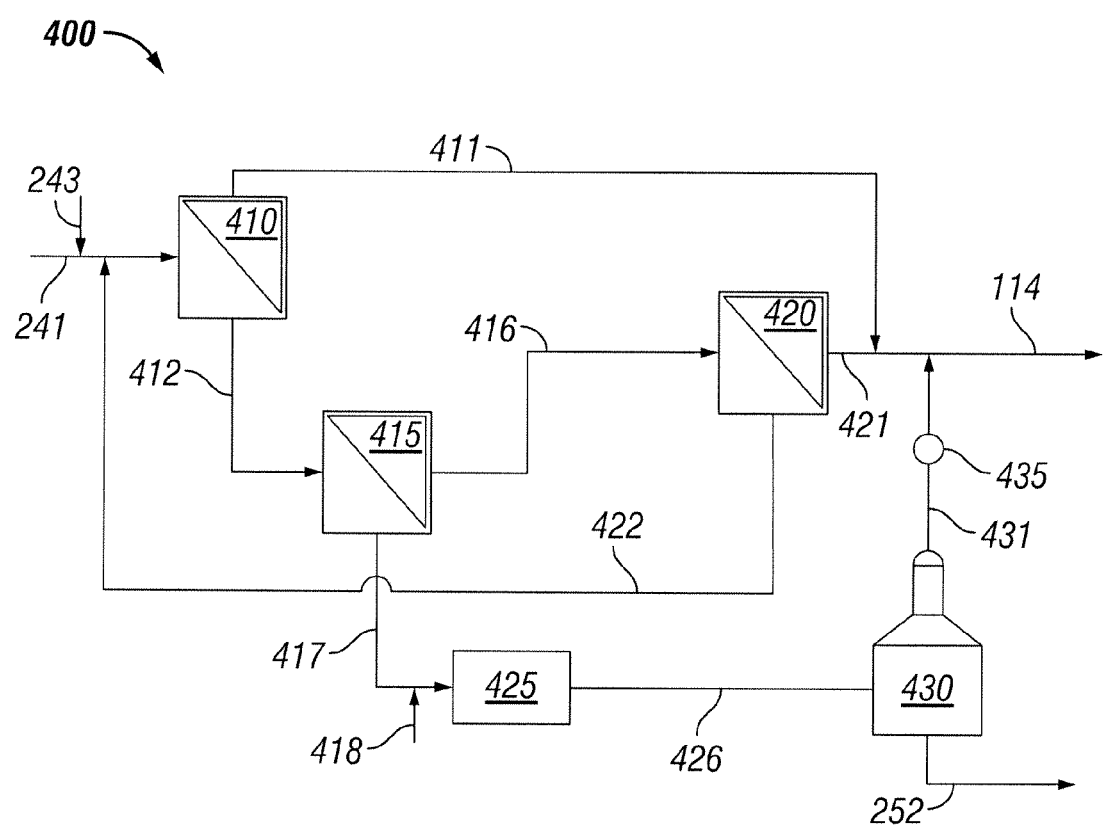
FIG. 4 shows a simplified flowchart of a reverse osmosis section of the desalination and minerals extraction process unit of FIG. 2 in accordance with an exemplary embodiment of the present invention.

FIG. 4 shows a simplified flowchart of a reverse osmosis section 400 of the desalination and minerals extraction process unit 110 of FIG. 2 in accordance with an exemplary embodiment of the present invention. The reverse osmosis section 400 is represented by the high efficiency RO unit 250 (FIG. 2). Referring to FIG. 4, the reverse osmosis section 400 includes a first stage RO unit 410, a second stage RO unit 415, a third stage RO unit 420, a second stage RO tank 425, a second stage RO MVR evaporator 430, and a second stage RO seawater heater 435.

The NF permeate stream 241 is mixed with a high purity caustic stream 243, thereby increasing the pH of the NF permeate stream 241 from a pH of about five to about six to a pH of about ten to eleven. The increased pH converts boron to borate and any residual silica to silicate. According to one exemplary embodiment, the flowrate of the NF permeate stream 241 is about ninety-eight percent of the flowrate of the seawater feed stream 106 (FIG. 1). The softened NF permeate stream 241 enters the first stage RO unit 410. The first stage RO unit 410 is a low pressure, low salt rejection RO unit. Within the first stage RO unit 410, the softened NF permeate stream 241 is separated into a first stage RO permeate stream 411 and a first stage RO non-permeate stream 412. The first stage RO permeate stream 411, which has had essentially all of the salt and much of the boron removed, exits the first stage RO unit 410 and is now desalinated product water, which can be used as potable water. The first stage RO non-permeate stream 412 is routed to the second stage RO unit 415. According to one exemplary embodiment, the first stage RO permeate stream 411 has a flowrate that is about forty-nine percent of the flowrate of the seawater feed stream 106 (FIG. 1), while the first stage RO non-permeate stream 412 has a flowrate that also is about forty-nine percent of the flowrate of the seawater feed stream 106 (FIG. 1).

The first stage RO non-permeate stream 412 and a third stage RO non-permeate stream 422, which is discussed in further detail below, combine and enter the second stage RO unit 415. The second stage RO unit 415 is a high pressure, low salt rejection RO unit. Within the second stage RO unit 415, the first stage RO non-permeate stream 412 and the third stage RO non-permeate stream 422 are separated into a second stage RO permeate stream 416 and a second stage RO non-permeate stream 417. The second stage RO permeate stream 416, which has had essentially all of the salt and much of the boron removed, exits the second stage RO unit 415 and is routed to the third stage RO unit 420. The second stage RO non-permeate stream 417 is routed to the second stage RO tank 425.

The second stage RO permeate stream 416 enters the third stage RO unit 420. The third stage RO unit 420 is a brackish water RO unit according to one exemplary embodiment. Within the third stage RO unit 420, the second stage RO permeate stream 416 is separated into a third stage RO permeate stream 421 and the third stage RO non-permeate stream 422, which is routed to the first stage RO unit 410. The third stage RO permeate stream 421, which has had essentially all of the salt and much of the boron removed, exits the third stage RO unit 420 and is now desalinated product water, which can be used as potable water. This third stage RO permeate stream 421 is higher purity than the first stage RO unit permeate stream 411 and is combined together to make acceptable quality desalinated water according to some exemplary embodiments. The first stage RO unit 410 and the third stage RO unit 420 combine to produce desalinated water that has a flowrate that is about seventy to about seventy-five percent of the flowrate of the seawater feed stream 106 (FIG. 1) according to one exemplary embodiment.

The second stage RO non-permeate stream 417 is combined with a hydrochloric acid stream 418 prior to entering the second stage RO tank 425. The second stage RO non-permeate stream 417 has a flowrate that is about twenty-five to about thirty percent of the flowrate of the seawater feed stream 106 (FIG. 1). The hydrochloric acid stream 418 lowers the pH of the second stage RO non-permeate stream 417 from about ten to about six to about seven. According to some exemplary embodiments, the acidified second stage RO non-permeate stream 417 is routed to an NF membrane (not shown) where the residual calcium and magnesium are removed from the brine concentrate as a non-permeate stream (not shown) that is recycled back to the primary NF settler hydroclone 315, while the permeate stream (not shown) is routed to the second stage RO tank 425. The second stage RO tank 425 produces a second stage RO tank discharge stream 426 that is routed to the second stage RO MVR evaporator 430. In certain exemplary embodiments, the second stage RO tank 425 is optional and either the acidified second stage RO non-permeate stream 417 or the permeate stream from the optional NF membrane is directly routed to the second stage RO MVR evaporator 430.

The second stage RO MVR evaporator 430 removes approximately sixty-five percent of the water from the second stage RO tank discharge stream 426 as high purity condensate and concentrates the brine to near the saturation point of sodium chloride. The high purity condensate exits the second stage RO MVR evaporator 430 via a second stage RO MVR evaporator overheads stream 431 and is combined with the third stage RO permeate stream 421 and the first stage RO unit permeate stream 411, which form the desalination water stream 114. The desalination water stream 114 has a flowrate that is about ninety-one percent of the flowrate of the seawater feed stream 106 (FIG. 1). According to certain exemplary embodiments, the second stage RO MVR evaporator overheads stream 431 is cooled through the second stage RO seawater heater 435 prior to being combined with the third stage RO permeate stream 421 and the first stage RO unit permeate stream 411. The second stage RO seawater heater 435 is used to provide heat to the UF permeate stream 221 (FIG. 2). A RO non-permeate stream 252 exits the second stage RO MVR evaporator 430 and is routed to the brine tank 255 (FIG. 2), as previously discussed. According to one exemplary embodiment, the RO non-permeate stream 252 has a flowrate that is about seven percent of the flowrate of the seawater feed stream 106 (FIG. 1).

According to another exemplary embodiment, the first stage RO unit permeate stream 411 is routed to the third stage RO unit 420 instead of being combined with the three stage RO permeate stream 416. Thus, the first stage RO unit permeate stream 411 is combined with the second stage RO permeate stream 416 prior to entering the three stage RO unit 430.

Figure 5:
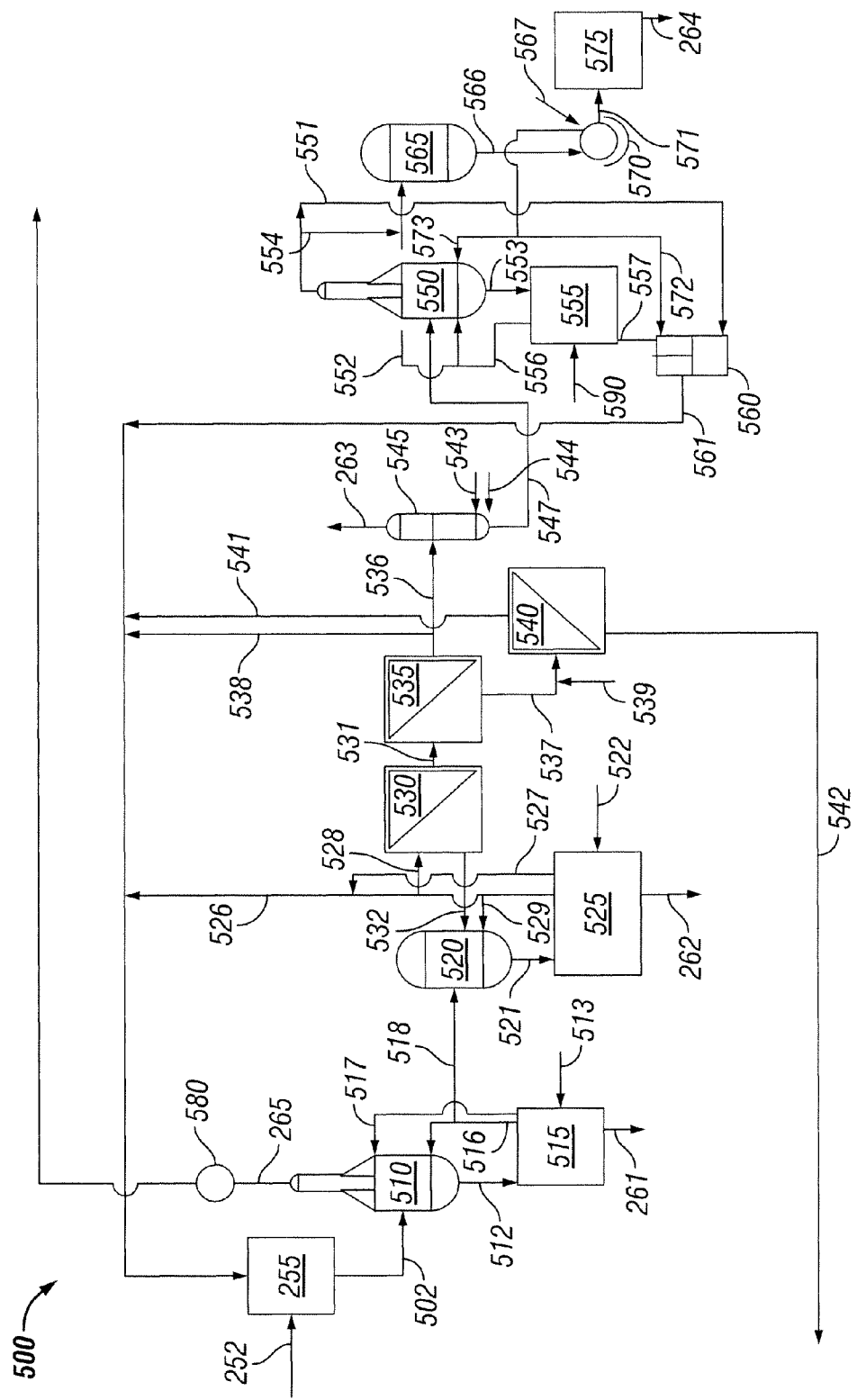
FIG. 5 shows a simplified flowchart of a reverse osmosis brine minerals recovery section of the desalination and minerals extraction process unit of FIG. 2 in accordance with an exemplary embodiment of the present invention.

FIG. 5 shows a simplified flowchart of a reverse osmosis brine minerals recovery section 500 of the desalination and minerals extraction process unit 110 of FIG. 2 in accordance with an exemplary embodiment of the present invention. For convenience and perspective for where the reverse osmosis brine minerals recovery section 500 is positioned, the brine tank 255 is shown in FIG. 5 even though it is not part of the reverse osmosis brine minerals recovery section 500. The reverse osmosis brine minerals recovery section 500 is represented by the second minerals recovery unit 260 (FIG. 2) and its associated streams. Referring to FIG. 5, the reverse osmosis brine minerals recovery section 500 includes a sodium chloride MVR crystallizer 510, a sodium chloride MVR crystallizer centrifuge 515, a potassium chloride chiller crystallizer 520, a potassium chloride chiller crystallizer centrifuge 525, a UF membrane 530, a primary NF membrane 535, a secondary NF membrane 540, a bromine oxidizer/stripper 545, a boric acid MVR crystallizer 550, a boric acid MVR crystallizer centrifuge 555, a salt slurry tank 560, a boric acid chiller crystallizer 565, a boric acid filter 570, and a boric acid dryer 575.

Referring to FIG. 5, the brine tank 255 receives the RO non-permeate stream 252. The brine tank 255 discharges a brine tank discharge stream 502 which is routed to the sodium chloride MVR crystallizer 510. The brine tank discharge stream 502 includes a saturated sodium chloride solution. The sodium chloride MVR crystallizer 510 processes the RO non-permeate stream 252 and produces the second minerals recovery demineralized water stream 265 and a sodium chloride MVR crystallizer bottoms stream 512. The second minerals recovery demineralized water stream 265 is a high purity condensate stream that can be used as potable water. According to some exemplary embodiments, the second minerals recovery demineralized water stream 265 is cooled through the sodium chloride MVR crystallizer seawater heater 580 prior to being used. The sodium chloride MVR crystallizer seawater heater 580 is used to provide heat to the UF permeate stream 221 (FIG. 2). According to one exemplary embodiment, the second minerals recovery demineralized water stream 265 has a flowrate of about 1550 gallons per minute ("GPM"). The sodium chloride MVR crystallizer bottoms stream 512 is routed to the sodium chloride MVR crystallizer centrifuge 515.

Within the sodium chloride MVR crystallizer centrifuge 515, the sodium chloride MVR crystallizer bottoms stream 512 is processed to remove the sodium chloride. A desalinated water stream 513 is supplied to the sodium chloride MVR crystallizer centrifuge 515 and used to wash the sodium chloride, thereby producing high purity chloralkali grade sodium chloride. According to one exemplary embodiment, the flowrate of the desalination water stream is about fifty GPM. The high purity chloralkali grade sodium chloride is removed from the sodium chloride MVR crystallizer centrifuge 515 using the high purity salt stream 261. According to one exemplary embodiment, the high purity salt stream includes greater than 99.95 weight percent sodium chloride on a dry basis. The sodium chloride MVR crystallizer centrifuge 515 also produces a first sodium chloride MVR crystallizer centrifuge discharge stream 516 and a second sodium chloride MVR crystallizer centrifuge recycle stream 517. The first sodium chloride MVR crystallizer centrifuge discharge stream 516 is mostly recycled back to the sodium chloride MVR crystallizer centrifuge 515. However, a portion of the first sodium chloride MVR crystallizer centrifuge discharge stream 516 is routed to the potassium chloride chiller crystallizer 520 via a sodium chloride purge stream 518. According to one exemplary embodiment, the sodium chloride purge stream 518 is about 100 GPM. This sodium chloride purge stream 518 facilitates preventing potassium chloride precipitation within the sodium chloride MVR crystallizer 510. The second sodium chloride MVR crystallizer centrifuge recycle stream 517 is recycled back to the sodium chloride MVR crystallizer centrifuge 515.

The potassium chloride chiller crystallizer 520 processes the sodium chloride purge stream 518 and produces a potassium chloride chiller crystallizer bottoms stream 521. Within the potassium chloride chiller crystallizer 520, the sodium chloride purge stream 518 is cooled which precipitates the high purity potassium chloride. The potassium chloride chiller crystallizer bottoms stream 521, which includes the high purity potassium chloride precipitation, is routed to the potassium chloride chiller crystallizer centrifuge 525.

Within the potassium chloride chiller crystallizer centrifuge 525, the potassium chloride chiller crystallizer bottoms stream 521 is processed to remove the potassium chloride. A desalination water stream 522 is supplied to the potassium chloride chiller crystallizer centrifuge 525 and used to wash the potassium chloride, thereby producing high purity potassium chloride. According to one exemplary embodiment, the flowrate of the desalination water stream is about two GPM. The high purity potassium chloride is removed from the potassium chloride chiller crystallizer centrifuge 525 using the high purity potassium chloride stream 262, which is sold to market as byproduct potassium chloride salt or solution. The potassium chloride chiller crystallizer centrifuge 525 also produces a first potassium chloride chiller crystallizer centrifuge discharge stream 526 and a second potassium chloride chiller crystallizer centrifuge discharge stream 527. The first potassium chloride chiller crystallizer centrifuge discharge stream 526 is partly recycled back to the brine tank 255. However, a portion of the first potassium chloride chiller crystallizer centrifuge discharge stream 526 is routed to the UF membrane 530 via a potassium chloride purge stream 528. According to one exemplary embodiment, the potassium chloride purge stream 528 is about fifty GPM. This potassium chloride purge stream 528 facilitates preventing calcium chloride, magnesium chloride, sodium bromide or boric acid precipitation within either the sodium chloride MVR crystallizer 510 or the potassium chloride chiller crystallizer 520. Additionally, the first potassium chloride chiller crystallizer centrifuge discharge stream 526 also is partly recycled back to the potassium chloride chiller crystallizer 520 via a potassium chloride chiller crystallizer centrifuge recycle stream 529. The second potassium chloride chiller crystallizer centrifuge discharge stream 527 is recycled back to the brine tank 255.

The potassium chloride purge stream 528 is heated in a heat exchanger (not shown) against a portion of the second minerals recovery demineralized water stream 265. It is then routed to the UF membrane 530, which separates the potassium chloride purge stream 528 into a UF permeate stream 531 and a UF non-permeate stream 532. The UF permeate stream 531 is routed to the NF membrane 535, while the UF non-permeate stream 532 is recycled back to potassium chloride chiller crystallizer 520. According to one exemplary embodiment, the flowrate of the UF permeate stream 531 is about fifty GPM.

The UF permeate stream 531 is routed to the NF membrane 535, which separates the UF permeate stream 531 into a NF permeate stream 536 and a NF non-permeate stream 537. The NF permeate stream 536 is routed to the bromine oxidizer/stripper 545, while the NF non-permeate stream 537 is routed to the secondary NF membrane 540. A portion of the NF permeate stream 536 also is recycled back to the brine tank 255 via a NF permeate recycle stream 538. According to one exemplary embodiment, the flowrate of the NF permeate stream 536 flowing towards the bromine oxidizer/stripper 545 is about twenty GPM, the flowrate of the NF permeate recycle stream 538 is about twenty GPM, and the flowrate of the NF non-permeate stream 537 is about ten GPM.

The NF non-permeate stream 537 is combined with a desalination water stream 539 and routed to the secondary NF membrane 540, which separates the combined NF non-permeate stream 537 and the desalination water stream 539 into a secondary NF permeate stream 541 and a secondary NF non-permeate stream 542. According to one exemplary embodiment, the flowrate of the desalination water stream 539 is about forty GPM. The secondary NF permeate stream 541 is recycled back to the brine tank 255. According to one exemplary embodiment, the flowrate of the secondary NF permeate stream 541 is about forty GPM. The secondary NF non-permeate stream 542, which includes some calcium, magnesium, sulfate, and about five weight percent of sodium chloride according to one embodiment, is recycled to the primary NF settler hydroclone 315 (FIG. 3). According to one exemplary embodiment, the secondary NF non-permeate stream 542 has a flowrate of about ten GPM.

The NF permeate stream 536, a chlorine stream 543, and a low pressure steam stream 544 enter the bromine oxidizer/stripper 545. The chlorine is used to convert the bromide within the NF permeate stream 536 into bromine. The low pressure steam stream 544 is used to strip the bromine and any residual chlorine from the treated NF permeate stream 536. This process is described with U.S. Pat. No. 4,725,425, which is incorporated by reference herein. The bromine oxidizer/stripper 545 produces the high purity bromine stream 263 and a bromine oxidizer/stripper tail stream 547. The high purity bromine stream 263 is a vapor stream that includes bromine. The product bromine is condensed out from the high purity bromine stream 263 as a product liquid. In one example, a portion of the NF permeate stream 536 is used to scrub the vapor from the bromine condenser, thereby preventing the release of bromine or chlorine. The bromine oxidizer/stripper tail stream 547 is routed to the boric acid MVR crystallizer 550 to purge boric acid from the bromine oxidizer/stripper 545 and prevent product salt contamination.

The boric acid MVR crystallizer 550 processes the bromine oxidizer/stripper tail stream 547 and produces a boric acid MVR crystallizer overheads stream 551, a boric acid purge stream 552, and a boric acid MVR crystallizer bottoms stream 553. Within the boric acid MVR crystallizer 550, the bromine oxidizer/stripper tail stream 547 is evaporated to a point that is near the saturation point of boric acid. Approximately eighty percent of the bromine oxidizer/stripper tail stream 547 is recovered as high purity wash and slurry water. This high purity wash and slurry water is removed from boric acid MVR crystallizer 550 via the boric acid MVR crystallizer overheads stream 551. The boric acid MVR crystallizer overheads stream 551 is routed to the salt slurry tank 560. According to one exemplary embodiment, the flowrate of the boric acid MVR crystallizer overheads stream 551 flowing to the salt slurry tank 560 is about fourteen GPM. In some exemplary embodiments, a portion of the boric acid MVR crystallizer overheads stream 551 is routed to the boric acid chiller crystallizer 565 via a boric acid MVR crystallizer overheads slip stream 554 which prevents potassium chloride precipitation in the boric acid chiller crystallizer 565. The boric acid purge stream 552 also is routed to the boric acid chiller crystallizer 565. The boric acid MVR crystallizer 550 produces a mixed salt that includes sodium chloride and potassium chloride. This mixed salt is removed from the boric acid MVR crystallizer 550 through the boric acid MVR crystallizer bottoms stream 553 that is routed to the boric acid MVR crystallizer centrifuge 555.

Within the boric acid MVR crystallizer centrifuge 555, the boric acid MVR crystallizer bottoms stream 553 is processed to remove the sodium chloride and the potassium chloride. A desalination water stream 590 is supplied to the boric acid MVR crystallizer centrifuge 555 and used to wash the sodium chloride and the potassium chloride. According to one exemplary embodiment, the flowrate of the desalination water stream is about two GPM. The sodium chloride and the potassium chloride are removed from the boric acid MVR crystallizer centrifuge 555 using the boric acid MVR crystallizer centrifuge discharge stream 557, which is routed to the salt slurry tank 560. The boric acid MVR crystallizer centrifuge 555 also produces a boric acid MVR crystallizer centrifuge filtrate stream 556, most of which is recycled back to the boric acid MVR crystallizer 550 with the remainder routed to the boric acid chiller crystallizer 565 as boric acid purge stream 552.

Within the salt slurry tank 560, the boric acid MVR crystallizer centrifuge discharge stream 557 is mixed and slurried with the a portion of the boric acid MVR crystallizer overheads stream 551 and a filter purge stream 572, which is discussed in further detail below. In one exemplary embodiment, the filter purge stream 572 is about five GPM. A salt slurry tank discharge stream 561 exits the salt slurry tank 560 and is recycled back to the brine tank 255. According to one exemplary embodiment, the salt slurry tank discharge stream 561 has a flowrate about twenty-four GPM.

The boric acid chiller crystallizer 565 processes the boric acid purge stream 552 and the boric acid MVR crystallizer overheads slip stream 554 and produces a boric acid chiller crystallizer bottoms stream 566. Within the boric acid chiller crystallizer 565, the boric acid purge stream 552 and the boric acid MVR crystallizer overheads slip stream 554 are cooled which precipitates most of the boric acid. The boric acid chiller crystallizer bottoms stream 566, which includes the boric acid precipitation, is routed to the boric acid filter 570.

Within the boric acid filter 570, the boric acid chiller crystallizer bottoms stream 566 is filtered and washed using a portion of the boric acid MVR crystallizer overheads stream 567 that has been chilled. Alternatively, chilled desalinated water is used for the wash. The boric acid filter cake is then sold as a byproduct via the boric acid filter discharge stream 571 according to one exemplary embodiment. Alternatively, the boric acid filter cake is sent to the boric acid dryer 575 via the boric acid filter discharge stream 571, where the boric acid filter cake is dried and then sold as a boric acid dry product through the high purity boric acid stream 264. In one exemplary embodiment, the boric acid dryer 575 is a steam heated rotary dryer. The boric acid filter 570 produces the filter purge stream 572, which as previously discussed, is sent to the salt slurry tank 560. A portion of the filter purge stream 572 is recycled to the boric acid MVR crystallizer 550 via a filter purge slip stream 573.

Figure 6:
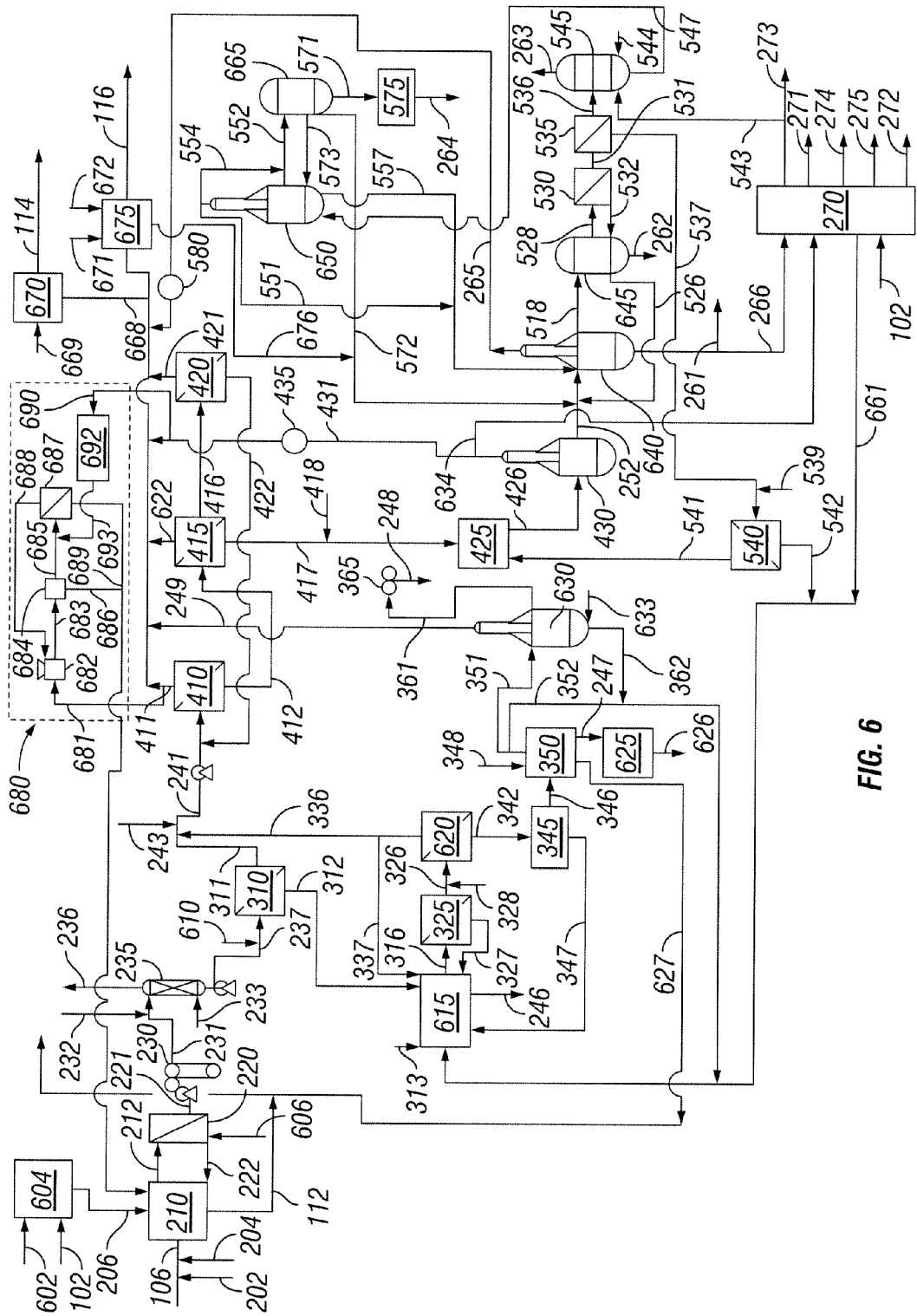
FIG. 6 shows a detailed flowchart of the desalination and minerals extraction process unit of FIG. 2 in accordance with an exemplary embodiment of the present invention.

FIG. 6 shows a detailed flowchart of the desalination and minerals extraction process unit 110 of FIG. 2 in accordance with an exemplary embodiment of the present invention. Referring to FIG. 6, the seawater feed stream 106 is mixed with the sodium hypochlorite stream 202, or chlorine stream (not shown), and the hydrochloric acid stream 204, or sulfuric acid stream (not shown). This mixing of the seawater feed stream 106 with the sodium hypochlorite stream 202 and the hydrochloric acid stream 204 reduces the pH of the seawater feed stream 106 from about eight to less than about 6.5, and disinfects the seawater feed stream 106, thereby eliminating or reducing biological growth. The low pH, or acidic pH, inhibits barnacle and zebra mussel growth since the low pH causes dissolution of the calcium carbonate shells. The acidic pH also promotes hypochlorous acid and hypobromous acid formation which increases the biocide effectiveness of the chlorine or hypochlorite. This allows the chlorine or the hypochlorite to be dosed at periodic intervals, for example, offline cleaning and/or shock treatments, thereby minimizing the production of organic fragments which can cause biofilm fouling in the downstream equipment. According to one exemplary embodiment, the flowrate of the seawater feed stream 106 is about 20,400 GPM at about sixty-five to about eighty-five degrees Fahrenheit.

The ferric chloride stream 206 and the insolubles from dolime slaking stream (627) are mixed with the acidified and disinfected seawater feed stream 106, which is then routed to the settler/filter 210. In certain exemplary embodiments, the ferric chloride stream 206 is mixed with the acidified and disinfected seawater feed stream 106 within the settler/filter 210. At least a portion of the ferric chloride stream 206 is produced from the scrap iron or iron oxide feed stream 102 and a chlorine stream 602 within an iron chloride production system 604 according to certain exemplary embodiments. Alternatively or additionally, at least a portion of the ferric chloride feed stream 206 is produced from the chloralkali unit 270. In some exemplary embodiments, the settler/filter 210 includes a ballasted settler.

Within the settler/filter 210, the combination of the low pH, the ferric chloride, the calcium sulfate, and sand ballast causes the silica rich silt within the seawater to rapidly flocculate and settle out of the seawater. Additionally, the iron polymerizes the reactive silica, thereby leaving the seawater essentially free of reactive silica. In some exemplary embodiments, an additional acid stream (not shown) is added to the settler/filter 210 to maintain the pH within the settler/filter 210 below about 6.5. Within the settler/filter 210, an acidic, iron rich sludge from the bottom of the settler is routed to a filter press where the sludge is filtered and washed with a portion of the desalinated product water. The settler/filter 210 produces the washed filter cake stream 211 (FIG. 2) and the settler overflow stream 212.

The washed filter cake stream 211 (FIG. 2) is routed to the pelletizer/dryer 215 (FIG. 2) where heat from the natural gas combined cycle power unit 150 (FIG. 1) is used to dry the filter cake stream 211 (FIG. 2). The heat provided from the natural gas combined cycle power unit 150 (FIG. 1) is in the form of either low pressure steam, hot exhaust gas, or power from a vapor recompression dryer. The pelletizer/dryer 215 (FIG. 2) produces the iron rich stream 112, which includes a dried and pelletized filter cake. The iron rich stream 112 is sold as an iron rich soil amendment according to one exemplary embodiment. In an alternative exemplary embodiment, however, the iron rich stream 112 is transported to a gasification unit 680, where the iron rich stream 112 is used as a fluxant to lower the melting point of the slag in a gasifier 692. In some exemplary embodiments, a combination of selling and using the iron rich stream 112 is performed.

The settler overflow stream 212 is routed to the UF membrane 220 where residual solids and polymerized silica are removed, along with most of the remaining pathogens, algae, and/or other biological organisms. Within the UF membrane 220, the settler overflow stream 212 is separated into the UF permeate stream 221 and the UF non-permeate stream 222. The UF permeate stream 221, which has had essentially all the suspended solids, bacteria, viruses, and microbes removed, exits the UF membrane 220 and flows to at least the ST condenser 230, which is also used within the natural gas combined cycle power unit 150 (FIG. 1). In some exemplary embodiments, the UF permeate stream 221 also flows to one or more closed-loop utility cooling water exchangers, such as a Thermal Energy Storage ("TES") chiller one stage 870, TES chiller two stage 880, and other seawater preheaters. The UF non-permeate stream 222, which contains essentially all the suspended solids, viruses, and microbes, exits the UF membrane 220 and is recycled back to the settler/filter 210. According to one exemplary embodiment, the settler overflow stream 212 has a pH of about 6.5. In some exemplary embodiments, a sodium hypochlorite stream 606 is added to the settler overflow stream 212 at the UF membrane 220.

The UF permeate stream 221 has a temperature of about sixty-five to about eighty-five degrees Fahrenheit and enters the ST condenser 230 and other closed-loop exchangers, where it is heated to produce a ST condenser preheated seawater stream 231. The ST condenser preheated seawater stream 231 exits the ST condenser 230 at a temperature of about eighty-five to about 105 degrees Fahrenheit. The ST condenser preheated seawater stream 231 is then acidified with the hydrochloric acid stream 232, or a sulfuric acid stream (not shown), to a pH less than about four. This pH of about four or less converts essentially all of the carbonate and bicarbonate to free carbon dioxide. The acidified ST condenser preheated seawater stream 231 enters the air stripper 235.

The acidified ST condenser preheated seawater stream 231 and the air stream 233 enter the air stripper 235. According to an exemplary embodiment, the air stripper 235 operates at a pH of about four and a temperature of about ninety-seven degrees Fahrenheit. In some exemplary embodiments, the temperature ranges from about ninety-five degrees Fahrenheit to about 100 degrees Fahrenheit. In certain exemplary embodiments, the air stream 233 is untreated. In some exemplary embodiments, the air stream 233 is treated to remove some or all of the carbon dioxide from the air stream 233. One example for treating the air stream 233 involves using chillers and molecular sieves. Alternatively, a nitrogen stream (not shown) or waste nitrogen stream (not shown) from an air separation unit (not shown), which is substantially free from carbon dioxide, is used in lieu of the air stream 233. By treating the air stream 233 or using a nitrogen stream, the number of stages of stripping and the quantity of stripping air stream 233 that is used are reduced. Within the air stripper 235, the air stream 233 strips the acidified ST condenser preheated seawater stream 231 to remove essentially all of the carbon dioxide from the acidified ST condenser preheated seawater stream 231. The air stripper 235 produces the carbon dioxide stream 236, or off-gas stream, which is used in another process or is allowed to be discharged into the environment, and the air stripper discharge stream 237. The air stripper discharge stream 237 is routed to the primary NF membrane 310. Prior to entering the primary NF membrane 310, the air stripper discharge stream 237 is treated with a sodium bisulfate stream 610 to convert any residual hypobromous or hydrochlorous acid (biocide) to hydrobromic or hydrochloric acid. This treatment prevents or minimizes chemical attack of the downstream NF membranes 310 and 620 or RO membranes 410, 415, and 420.

The air stripper discharge stream 237 enters the primary NF membrane 310 where the air stripper discharge stream 237 is separated into the primary NF permeate stream 311 and the primary NF non-permeate stream 312. According to an exemplary embodiment, the primary NF membrane 310 operates at a pH of about five to about six. At this pH, the primary NF membrane 310 is negatively charged, thereby maximizing sulfate rejection. The primary NF membrane 310 removes most of the sulfate, calcium, magnesium, residual iron, residual bacteria, and other trace divalent metals from the air stripper discharge stream 237. The primary NF permeate stream 311, which has had essentially all of the sulfate, calcium, magnesium, residual iron, and other trace divalent metals in the seawater removed, exits the primary NF membrane 310 and flows toward the first stage RO unit 410. The primary NF non-permeate stream 312, which includes essentially all the sulfate, calcium, magnesium, residual iron, and other trace divalent metals in the seawater, exits the primary NF membrane 310 and flows to a gypsum settler/filter 615. The gypsum settler/filter 615 represents the primary NF settler hydroclone 315 (FIG. 3) and the primary NF filter 320 (FIG. 3). According to one exemplary embodiment, the primary NF permeate stream 311 has a flowrate of about 16,400 GPM, while the primary NF non-permeate stream 312 has a flowrate of about 4,000 GPM.

The primary NF non-permeate stream 312, the lime/dolime stream 313, the calcium chloride recycle stream 352 which is discussed in further detail below, the UF non-permeate stream 327 which is discussed in further detail below, the gypsum slurry stream 347, the secondary NF hydroclone sodium chloride slurry stream 362, the secondary NF non-permeate stream 542, and a chloralkali purge stream 661 which is discussed in further detail below, are mixed together and routed to the gypsum settler/filter 615. In one exemplary embodiment, the pH of the calcium chloride recycle stream 352 is about nine to about ten. Within the gypsum settler/filter 615, the calcium combines with the sulfate producing a high purity calcium sulfate, or gypsum, precipitate. The excess calcium from the calcium chloride recycle stream 352 causes essentially all of the sulfate, about greater than ninety-five percent, to be removed from the primary NF non-permeate stream 312. The settler bottoms are filtered and washed with desalinated water. The gypsum settler/filter 615 produces the high purity gypsum stream 246 and the primary NF settler hydroclone overflow stream 316. The high purity gypsum stream 246 is sold as a byproduct according to one exemplary embodiment.

The primary NF settler hydroclone overflow stream 316 is mixed with a portion of the second secondary NF permeate stream 337, which is described in further detail below, and routed to the UF membrane 325 where any trace solids within the primary NF settler hydroclone overflow stream 316 and the portion of the second secondary NF permeate stream 337 is removed. The UF membrane 325 separates the primary NF settler hydroclone overflow stream 316 and the portion of the second secondary NF permeate stream 337 into the UF permeate stream 326 and the UF non-permeate stream 327 which, as previously mentioned, is recycled back to the gypsum settler/filter 615. The solids free UF permeate stream 326 is routed to a secondary NF membrane 620. According to one exemplary embodiment, the secondary NF membrane 620 represents the first secondary NF membrane 330 (FIG. 3), the second secondary NF membrane 335 (FIG. 3), and the third secondary NF membrane 340 (FIG. 3) and can be positioned similarly.

The UF permeate stream 326 is mixed with the hydrochloric acid stream 328 to lower the pH to about three to about four. At this pH, the first secondary NF membrane 330 is positively charged, thereby maximizing calcium and magnesium rejection. The secondary NF membrane 620 separates the UF permeate stream 326 into the second secondary NF permeate stream 336 and the third secondary NF non-permeate stream 342. The calcium and the magnesium chloride within the UF permeate stream 326 are concentrated within the third secondary NF non-permeate stream 342. As previously mentioned, a portion of the second secondary NF permeate stream 337 is recycled back to the UF membrane 325. The remaining portion of the second secondary NF permeate stream 336 is combined with the primary NF permeate stream 311 and flows toward the first stage RO unit 410 via the NF permeate stream 241. According to one exemplary embodiment, the remaining portion of the second secondary NF permeate stream 336 has a flowrate of about 3,600 GPM and a pH of about four. According to one exemplary embodiment, the third secondary NF non-permeate stream 342 has a flowrate of about 1,000 GPM.

The third secondary NF non-permeate stream 342 is routed to the secondary NF settler hydroclone 345, which operates at a pH of about eight to about nine through lime or dolime addition. The calcium and residual sulfate in the NF non-permeate stream 342 react forming additional gypsum. The secondary NF settler hydroclone 345 produces the gypsum slurry stream 347 which, as previously mentioned, is recycled to the gypsum settler/filter 620 and a secondary NF settler hydroclone overflow stream 346, which is concentrated calcium and magnesium chloride and essentially sulfate free.

The secondary NF settler hydroclone overflow stream 346 is mixed with the high purity slaked dolime slurry stream 343 (FIG. 3) or 348 and is routed to the secondary NF settler filter 350. Within the secondary NF settler filter 350, the dolime precipitates the magnesium as magnesium hydroxide while leaving the calcium chloride in solution. The magnesium hydroxide is then filtered from the solution and subsequently washed. The secondary NF settler filter 350 produces the high purity magnesium hydroxide stream 247, which is sold. Alternatively, the high purity magnesium hydroxide stream 247 is calcined in a calciner 625 and sold as magnesium oxide via a high purity magnesium oxide stream 626. The insoluble material from the dolime slaker (not shown) is filtered, washed with desalinated water, and mixed with the iron rich stream 112 via an insoluble material stream 627. Additionally, the secondary NF settler filter 350 produces the secondary NF settler filter overflow stream 351 that is routed to the secondary NF evaporator 630. In certain exemplary embodiments, the secondary NF evaporator 630 represents the secondary NF evaporator 355 (FIG. 3) and the secondary NF hydroclone 360 (FIG. 3). However, a portion of the secondary NF settler filter overflow stream 351 is recycled back to the gypsum settler/filter 615 via the calcium chloride recycle stream 352. According to one exemplary embodiment, the secondary NF settler filter overflow stream 351 has a pH of about ten and about seventeen weight percent calcium chloride. According to one exemplary embodiment, the calcium chloride recycle stream 352 has a pH of about ten and a flowrate of about 500 GPM.

The secondary NF evaporator 630 receives the secondary NF settler filter overflow stream 351 and a low pressure steam stream 633 and separates streams 351 and 633 into the first minerals recovery demineralized water stream 249, a secondary NF hydroclone overflow stream 361, and a secondary NF hydroclone sodium chloride slurry stream 362. The secondary NF evaporator 630 uses a medium or low pressure steam stream 633 to concentrate the calcium chloride to over seventy-five weight percent and produce a high purity condensate, which makes up the first minerals recovery demineralized water stream 249. The first minerals recovery demineralized water stream 249 has a flowrate of about 400 GPM. The secondary NF hydroclone sodium chloride slurry stream 362 is recycled back to the gypsum settler/filter 615 where it is used to precipitate sulfate as gypsum. The secondary NF hydroclone overflow stream 361 is routed to the secondary NF flaker/pelletizer 365, where the secondary NF hydroclone overflow stream 361 is eventually formed into the calcium chloride stream 248. The calcium chloride stream 248 is sold to market as calcium chloride flakes or pellets.

The NF permeate stream 241 is mixed with the high purity caustic stream 243, thereby increasing the pH of the NF permeate stream 241 from a pH of about five to about six to a pH of about ten to eleven. The increased pH converts boron to borate and any residual silica to silicate. According to one exemplary embodiment, the flowrate of the NF permeate stream 241 is about 20,000 GPM and has a pH of about ten. The softened NF permeate stream 241 enters the first stage RO unit 410. The first stage RO unit 410 is a low pressure, low salt rejection RO unit. Within the first stage RO unit 410, the softened NF permeate stream 241 is separated into the first stage RO permeate stream 411 and the first stage RO non-permeate stream 412. The first stage RO permeate stream 411, which has had essentially all of the salt and much of the boron removed, exits the first stage RO unit 410 and is now desalinated product water, which can be used as potable water. According to certain exemplary embodiments, the first stage RO permeate stream 411 is routed to either a remineralizer 670 with a carbon dioxide and dolime stream 669 for desalinated water use or an ion exchange polishing resin 675 for demineralized water use, which is discussed in further detail below. The first stage RO non-permeate stream 412 is routed to the second stage RO unit 415. According to one exemplary embodiment, the first stage RO permeate stream 411 has a flowrate about 10,000 GPM, while the first stage RO non-permeate stream 412 has a flowrate about 10,000 GPM.

The first stage RO non-permeate stream 412 and the third stage RO non-permeate stream 422, which is discussed in further detail below, combine and enter the second stage RO unit 415. The second stage RO unit 415 is a high pressure, low salt rejection RO unit. Within the second stage RO unit 415, the first stage RO non-permeate stream 412 and the third stage RO non-permeate stream 422 are separated into the second stage RO permeate stream 416 and the second stage RO non-permeate stream 417. The second stage RO permeate stream 416, which has had essentially all of the salt and much of the boron removed, exits the second stage RO unit 415 and is routed to the third stage RO unit 420. However, in certain exemplary embodiments, at least a portion of the second stage RO permeate stream 632 is optionally routed to either the remineralizer 670 with the carbon dioxide and dolime stream 669 for desalinated water use or the ion exchange polishing resin 675 for demineralized water use, which is discussed in further detail below, or can be routed and discharged into a body of water. The second stage RO non-permeate stream 417 is routed to the second stage RO tank 425. According to one exemplary embodiment, the second stage RO permeate stream 416 has a flowrate about 5,500 GPM, while the second stage RO non-permeate stream 417 has a flowrate about 5,000 GPM.

The second stage RO permeate stream 416 enters the third stage RO unit 420. The third stage RO unit 420 is a brackish water RO unit according to one exemplary embodiment. Within the third stage RO unit 420, the second stage RO permeate stream 416 is separated into the third stage RO permeate stream 421 and the third stage RO non-permeate stream 422, which is routed to the first stage RO unit 410. The third stage RO permeate stream 421, which has had essentially all of the salt and much of the boron removed, exits the third stage RO unit 420 and is now desalinated product water, which can be used as potable water. This third stage RO permeate stream 421 is higher purity than the first stage RO unit permeate stream 411 and is combined together to make acceptable quality desalinated water according to some exemplary embodiments. According to certain exemplary embodiments, the first stage RO permeate stream 411 and the third stage RO permeate stream 421 is routed to either the remineralizer 670 or the ion exchange polishing resin 675, which is discussed in further detail below. The first stage RO unit 410 and the third stage RO unit 420 combine to produce desalinated water that has a flowrate that is about seventy-five percent of the flowrate of the seawater feed stream 106 (FIG. 1) according to one exemplary embodiment. According to one exemplary embodiment, the third stage RO permeate stream 421 has a flowrate about 5,000 GPM, while the third stage RO non-permeate stream 422 has a flowrate about 500 GPM.

The second stage RO non-permeate stream 417 is combined with the hydrochloric acid stream 418 prior to entering the second stage RO tank 425. The hydrochloric acid stream 418 lowers the pH of the second stage RO non-permeate stream 417 from about ten to about six to about seven. According to some exemplary embodiments, the acidified second stage RO non-permeate stream 417 is routed to an NF membrane (not shown) where the residual calcium and magnesium are removed from the brine concentrate as a non-permeate stream (not shown) that is recycled back to the gypsum settler/filter 615, while the permeate stream (not shown) is routed to the second stage RO tank 425. The second stage RO tank 425 produces the second stage RO tank discharge stream 426 that is routed to the second stage RO MVR evaporator 430. In certain exemplary embodiments, the second stage RO tank 425 is optional and either the acidified second stage RO non-permeate stream 417 or the permeate stream from the optional NF membrane is directly routed to the second stage RO MVR evaporator 430.

The second stage RO MVR evaporator 430 removes approximately sixty-five percent of the water from the second stage RO tank discharge stream 426 as high purity condensate and concentrates the brine to near the saturation point of sodium chloride. The high purity condensate exits the second stage RO MVR evaporator 430 via the second stage RO MVR evaporator overheads stream 431 and is combined with the third stage RO permeate stream 421 and the first stage RO unit permeate stream 411, which form the desalination water stream 114 or the demineralized water stream 116. According to one exemplary embodiment, the second stage RO MVR evaporator overheads stream 431 has a flowrate about 3,500 GPM According to one exemplary embodiment, the desalination water stream 114 and the demineralized water stream 116 have a combined flowrate that is about 20,400 GPM. According to certain exemplary embodiments, the second stage RO MVR evaporator overheads stream 431 is cooled through the second stage RO seawater heater 435 prior to being combined with the third stage RO permeate stream 421 and the first stage RO unit permeate stream 411. The second stage RO seawater heater 435 is used to provide heat to one or more seawater streams, for example the UF permeate stream 221. In certain exemplary embodiment, a portion of the second stage RO MVR evaporator overheads stream 431 is routed to the chloralkali unit 270 via a second stage RO MVR evaporator overheads slip stream 634. The RO non-permeate stream 252 exits the second stage RO MVR evaporator 430 and is routed to the sodium chloride MVR crystallizer/centrifuge 640, which represents the sodium chloride MVR crystallizer 510 (FIG. 5) and the sodium chloride MVR crystallizer centrifuge 515 (FIG. 5). Optionally, a brine tank, similar to the brine tank 255 (FIG. 2), can be positioned between the second stage RO MVR evaporator 430 and the sodium chloride MVR crystallizer/centrifuge 640.

According to another exemplary embodiment not shown, the first stage RO unit permeate stream 411 is routed to the third stage RO unit 420 instead of being combined with the three stage RO permeate stream 416. Thus, the first stage RO unit permeate stream 411 is combined with the second stage RO permeate stream 416 prior to entering the three stage RO unit 430.

The RO non-permeate stream 252 is routed to the sodium chloride MVR crystallizer/centrifuge 640, which represents the sodium chloride MVR crystallizer 510 (FIG. 5) and the sodium chloride MVR crystallizer centrifuge 515 (FIG. 5). The sodium chloride MVR crystallizer/centrifuge 640 processes the RO non-permeate stream 252 and removes and washes the sodium chloride. The sodium chloride MVR crystallizer/centrifuge 640 produces the second minerals recovery demineralized water stream 265, the high purity salt stream 261, which is high purity chloralkali grade sodium chloride, and the sodium chloride purge stream 518.

The second minerals recovery demineralized water stream 265 is a high purity condensate stream that can be used as potable water. According to some exemplary embodiments, the second minerals recovery demineralized water stream 265 is cooled through the sodium chloride MVR crystallizer seawater heater 580 prior to being used. The sodium chloride MVR crystallizer seawater heater 580 is used to provide heat to one or more seawater streams, such as the UF permeate stream 221. According to one exemplary embodiment, the second minerals recovery demineralized water stream 265 has a flowrate of about 1500 gallons per minute ("GPM"). The high purity chloralkali grade sodium chloride is removed from the sodium chloride MVR crystallizer/centrifuge 640 using the high purity salt stream 261. According to some exemplary embodiments, at least a portion of the high purity chloralkali grade sodium chloride is sold to market as a byproduct via the high purity salt stream 261. In certain exemplary embodiments, a portion of the high purity chloralkali grade sodium chloride is routed to the chloralkali plant 270, which is discussed in further detail below. The sodium chloride purge stream 518 exits the sodium chloride MVR crystallizer/centrifuge 640 and is routed to the potassium chloride chiller crystallizer/centrifuge 645, which represents the potassium chloride chiller crystallizer 520 (FIG. 5) and the potassium chloride chiller crystallizer centrifuge 525 (FIG. 5). According to one exemplary embodiment, the sodium chloride purge stream 518 is about 100 GPM. This sodium chloride purge stream 518 facilitates preventing potassium chloride precipitation within the sodium chloride MVR crystallizer/centrifuge 640.

The portion of the high purity chloralkali grade sodium chloride that is routed to the chloralkali plant 270 is processed therein to form at least one of the iron chloride stream 271, the hydrochloric acid stream 272, the chlorine stream 273, the sodium hydroxide stream 274, and the sodium hypochlorite stream 275. In certain exemplary embodiments, at least a portion of one of the iron chloride stream 271, the hydrochloric acid stream 272, the chlorine stream 273, the sodium hydroxide stream 274, and the sodium hypochlorite stream 275 is used within the desalination and minerals extraction process plant 110. For example, a portion of the chlorine stream 273 is used within the bromine oxidizer/stripper 545 via the chlorine stream 543, which is further discussed below. The chloralkali plant 270 also produces a chloralkali purge stream 661 that is routed to the gypsum settler/filter 615. The chloralkali plant 270 is operated at maximum capacity during off-peak power periods (low power price periods) and at minimum capacity or turned off during on-peak power periods (high power price periods). This procedure minimizes the sale of NGCC power during off-peak power.

The potassium chloride chiller crystallizer/centrifuge 645 processes the sodium chloride purge stream 518 and produces the high purity potassium chloride stream 262, the potassium chloride chiller crystallizer centrifuge discharge stream 526, and the potassium chloride purge stream 528. Within the potassium chloride chiller crystallizer/centrifuge 645, the sodium chloride purge stream 518 is cooled which precipitates the high purity potassium chloride and is subsequently removed and washed within the centrifuge 525 (FIG. 5). The high purity potassium chloride is removed from the potassium chloride chiller crystallizer/centrifuge 645 using the high purity potassium chloride stream 262, which is sold to market as byproduct potassium chloride salt or solution. The potassium chloride chiller crystallizer centrifuge discharge stream 526 is recycled back to the sodium chloride MVR crystallizer/centrifuge 640 for further processing. According to one exemplary embodiment, the potassium chloride chiller crystallizer centrifuge discharge stream 526 is about 75 GPM. The potassium chloride purge stream 528 is heated in a heat exchanger (not shown) against a portion of the second minerals recovery demineralized water stream 265. It is then routed to the UF membrane 530. According to one exemplary embodiment, the potassium chloride purge stream 528 is about 25 GPM. This potassium chloride purge stream 528 facilitates preventing calcium chloride, magnesium chloride, sodium bromide, and/or boric acid precipitation within either the sodium chloride MVR crystallizer/centrifuge 640 or the potassium chloride chiller crystallizer/centrifuge 645.

The potassium chloride purge stream 528 is routed to the UF membrane 530, which separates the potassium chloride purge stream 528 into the UF permeate stream 531 and the UF non-permeate stream 532. The UF permeate stream 531 is routed to the NF membrane 535, while the UF non-permeate stream 532 is recycled back to potassium chloride chiller crystallizer/centrifuge 645.

The UF permeate stream 531 is routed to the NF membrane 535, which separates the UF permeate stream 531 into the NF permeate stream 536 and the NF non-permeate stream 537. The NF permeate stream 536 is routed to the bromine oxidizer/stripper 545, while the NF non-permeate stream 537 is routed to the secondary NF membrane 540. According to one exemplary embodiment, the flowrate of the NF non-permeate stream 537 is about five GPM.

The NF non-permeate stream 537 is combined with the desalination water stream 539 and routed to the secondary NF membrane 540, which separates the combined NF non-permeate stream 537 and the desalination water stream 539 into the secondary NF permeate stream 541 and the secondary NF non-permeate stream 542. According to one exemplary embodiment, the flowrate of the desalination water stream 539 is about twenty GPM. The secondary NF permeate stream 541 is recycled back to the second stage RO tank 425. According to one exemplary embodiment, the flowrate of the secondary NF permeate stream 541 is about twenty GPM. The secondary NF non-permeate stream 542, which includes some calcium, magnesium, sulfate, and about five weight percent of sodium chloride according to one embodiment, is recycled to the gypsum settler/filter 615. According to one exemplary embodiment, the secondary NF non-permeate stream 542 has a flowrate of about five GPM.

The NF permeate stream 536, the chlorine stream 543, and the low pressure steam stream 544 enter the bromine oxidizer/stripper 545. The chlorine is used to convert the bromide within the NF permeate stream 536 into bromine. The low pressure steam stream 544 is used to strip the bromine and any residual chlorine from the treated NF permeate stream 536. This process is described with U.S. Pat. No. 4,725,425, which is incorporated by reference herein. The bromine oxidizer/stripper 545 produces the high purity bromine stream 263 and the bromine oxidizer/stripper tail stream 547. The high purity bromine stream 263 is a vapor stream that includes bromine. The product bromine is condensed out from the high purity bromine stream 263 as a product liquid. In one example, a portion of the NF permeate stream 536 is used to scrub the vapor from the bromine condenser, thereby preventing the release of bromine or chlorine. The bromine oxidizer/stripper tail stream 547 is routed to a boric acid MVR crystallizer/centrifuge 650 to purge boric acid from the bromine oxidizer/stripper 545 and prevent product salt contamination. According to one exemplary embodiment, the flowrate of the bromine oxidizer/stripper tail stream 547 is about twenty GPM.

The boric acid MVR crystallizer/centrifuge 650 processes the bromine oxidizer/stripper tail stream 547 and produces the boric acid MVR crystallizer overheads stream 551, the boric acid purge stream 552, and the boric acid MVR crystallizer centrifuge discharge stream 557. Within the boric acid MVR crystallizer/centrifuge 650, the bromine oxidizer/stripper tail stream 547 is evaporated to a point that is near the saturation point of boric acid. Approximately eighty percent of the bromine oxidizer/stripper tail stream 547 is recovered as high purity wash and slurry water. This high purity wash and slurry water is removed from the boric acid MVR crystallizer/centrifuge 650 via the boric acid MVR crystallizer overheads stream 551. The boric acid MVR crystallizer overheads stream 551 is routed to the sodium chloride MVR crystallizer/centrifuge 640. According to one exemplary embodiment, the flowrate of the boric acid MVR crystallizer overheads stream 551 flowing to the sodium chloride MVR crystallizer/centrifuge 640 is about five GPM. In some exemplary embodiments, a portion of the boric acid MVR crystallizer overheads stream 551 is routed to the boric acid chiller crystallizer 565 via a boric acid MVR crystallizer overheads slip stream 554 which prevents potassium chloride precipitation in the boric acid chiller crystallizer 565. The boric acid purge stream 552 also is routed to the boric acid chiller crystallizer 565. The boric acid MVR crystallizer/centrifuge 650 produces a mixed salt that includes sodium chloride and potassium chloride. This mixed salt is removed in the boric acid MVR crystallizer centrifuge 555 (FIG. 5), washed, and slurried. This slurried mixed salt is routed to the sodium chloride MVR crystallizer/centrifuge 640 via the boric acid MVR crystallizer centrifuge discharge stream 557. According to one exemplary embodiment, the flowrate of the boric acid MVR crystallizer centrifuge discharge stream 557 is about eight GPM.

The boric acid chiller crystallizer/filter 665 processes the boric acid purge stream 552 and the boric acid MVR crystallizer overheads slip stream 554 and produces the boric acid filter discharge stream 571 and the filter purge stream 572.

Within the boric acid chiller crystallizer/filter 665, the boric acid purge stream 552 and the boric acid MVR crystallizer overheads slip stream 554 are cooled which precipitates most of the boric acid. The boric acid precipitate is filtered and washed using a portion of the boric acid MVR crystallizer overheads stream that has been chilled. Alternatively, chilled desalinated water is used for the wash. The boric acid filter cake is then sold as a byproduct via the boric acid filter discharge stream 571 according to one exemplary embodiment. Alternatively, the boric acid filter cake is sent to the boric acid dryer 575 via the boric acid filter discharge stream 571, where the boric acid filter cake is dried and then sold as a boric acid dry product through the high purity boric acid stream 264. In one exemplary embodiment, the boric acid dryer 575 is a steam heated rotary dryer. The filter purge stream 572 is sent to the sodium chloride MVR crystallizer/centrifuge 640 for further processing. According to one exemplary embodiment, the flowrate of the filter purge stream 572 is about five GPM. A portion of the filter purge stream 572 is recycled to the boric acid MVR crystallizer/centrifuge 650 via the filter purge slip stream 573.

According to some exemplary embodiments, the first stage RO unit permeate stream 411, the first minerals recovery demineralized water stream 249, the second stage RO MVR evaporator overheads stream 431, the third stage RO permeate stream 421, and the second minerals recovery demineralized water stream 265 are combined with one another and routed to either the remineralizer 670 with the carbon dioxide and dolime stream 669 to produce the desalination water stream 114 for desalinated water use or the ion exchange polishing resin 675 for demineralized water use. Within the ion exchange polishing resin 675, a sodium hydroxide stream 671 and a hydrochloric acid stream 672 are used to convert at least a portion of the combined first stage RO unit permeate stream 411, first minerals recovery demineralized water stream 249, second stage RO MVR evaporator overheads stream 431, third stage RO permeate stream 421, and second minerals recovery demineralized water stream 265 into the demineralized water stream 116.

According to some exemplary embodiments, a gasification unit 680 is integrated with the desalination and minerals extraction process unit 110. In these exemplary embodiments, a portion of the first stage RO unit permeate stream 411 is routed to a gasification cooling tower 682 via a gasification cooling tower supply stream 681. The gasification cooling tower supply stream 681 provides make-up water for the gasification cooling tower 682. According to one exemplary embodiment, the gasification cooling tower supply stream 681 has a flowrate of about 6,300 GPM. Also, a portion of the second stage RO MVR evaporator overheads stream 431 is routed to a gasifier 692 via a gasifier supply stream 690. According to one exemplary embodiment, the gasifier supply stream 690 has a flowrate of about 800 GPM. The gasifier 692 produces a gasifier discharge stream 693 which is routed to a gasification RO membrane 687. The gasification cooling tower 682 supplies a gasification cooling tower discharge stream 683 to gasification UF membrane 684. The gasification UF membrane 684 separates the gasification cooling tower discharge stream 683 into a gasification UF permeate stream 685 and a gasification UF non-permeate stream 686. The gasification UF non-permeate stream 686 is routed to the settler/filter 210 for further processing. The gasification UF permeate stream 685 is combined with the gasifier discharge stream 693 and is routed to the gasification RO membrane 687. The gasification RO membrane 687 separates the gasification UF permeate stream 685 and the gasifier discharge stream 693 into a gasification RO permeate stream 688 and a gasification RO non-permeate stream 689. The gasification RO non-permeate stream 689 is routed to the settler/filter 210 for further processing. The gasification UF non-permeate stream 686 and the gasification RO non-permeate stream 689 combine for a flowrate of about 400 GPM according to one exemplary embodiment. The gasification RO permeate stream 688 is routed to the gasification cooling tower 682 for further processing. According to one exemplary embodiment, the gasification RO permeate stream 688 has a flowrate of about 1,200 GPM.

Figure 7:
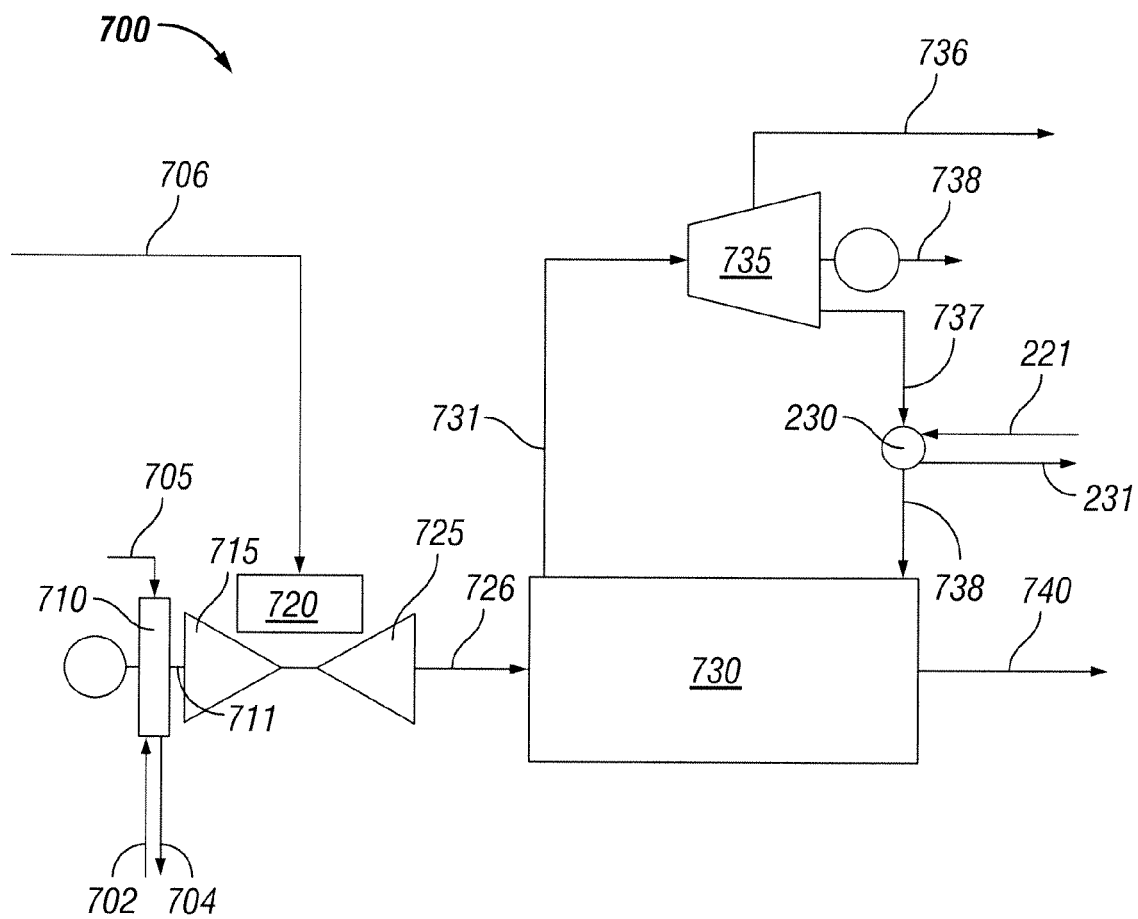
FIG. 7 shows a simplified flowchart of a natural gas combined cycle power unit of FIG. 1 in accordance with an exemplary embodiment of the present invention.

FIG. 7 shows a simplified flowchart of a natural gas combined cycle power unit 150 of FIG. 1 in accordance with an exemplary embodiment of the present invention. Referring to FIG. 7, the natural gas combined cycle power unit 150 includes a combustion turbine ("CT") inlet air chiller, a compressor 715, a combustion chamber 720, an expander 725, a heat recovery steam generator ("HRSG") 730, a steam turbine 735, and the ST condenser 230.

An air stream 705, which is typically ambient air, enters the CT inlet air chiller 710 for cooling. A CT inlet air chilled water supply stream 702 enters the CT inlet air chiller 710 and provides cooling for the air stream 705. The air stream 705 transfers heat to the CT inlet air chilled water supply stream 702, which then exits the CT inlet air chiller 710 via a CT inlet air chilled water return stream 704, which is discussed in further derail below. The CT inlet air chiller 710 produces a chilled air stream 711 that is routed to the compressor 715. Within the compressor 715, the chilled air stream 711 is compressed before entering the combustion chamber 720.

A natural gas stream 706 is routed to the combustion chamber 720 where it is combusted with the compressed chilled air stream 711. The combustion chamber 720 produces a combusted gas stream which enters the expander 725. The expander 725 decompresses the combusted gas stream and produces an expanded gas stream 726, which is routed to the HRSG 730.

Figure 8:
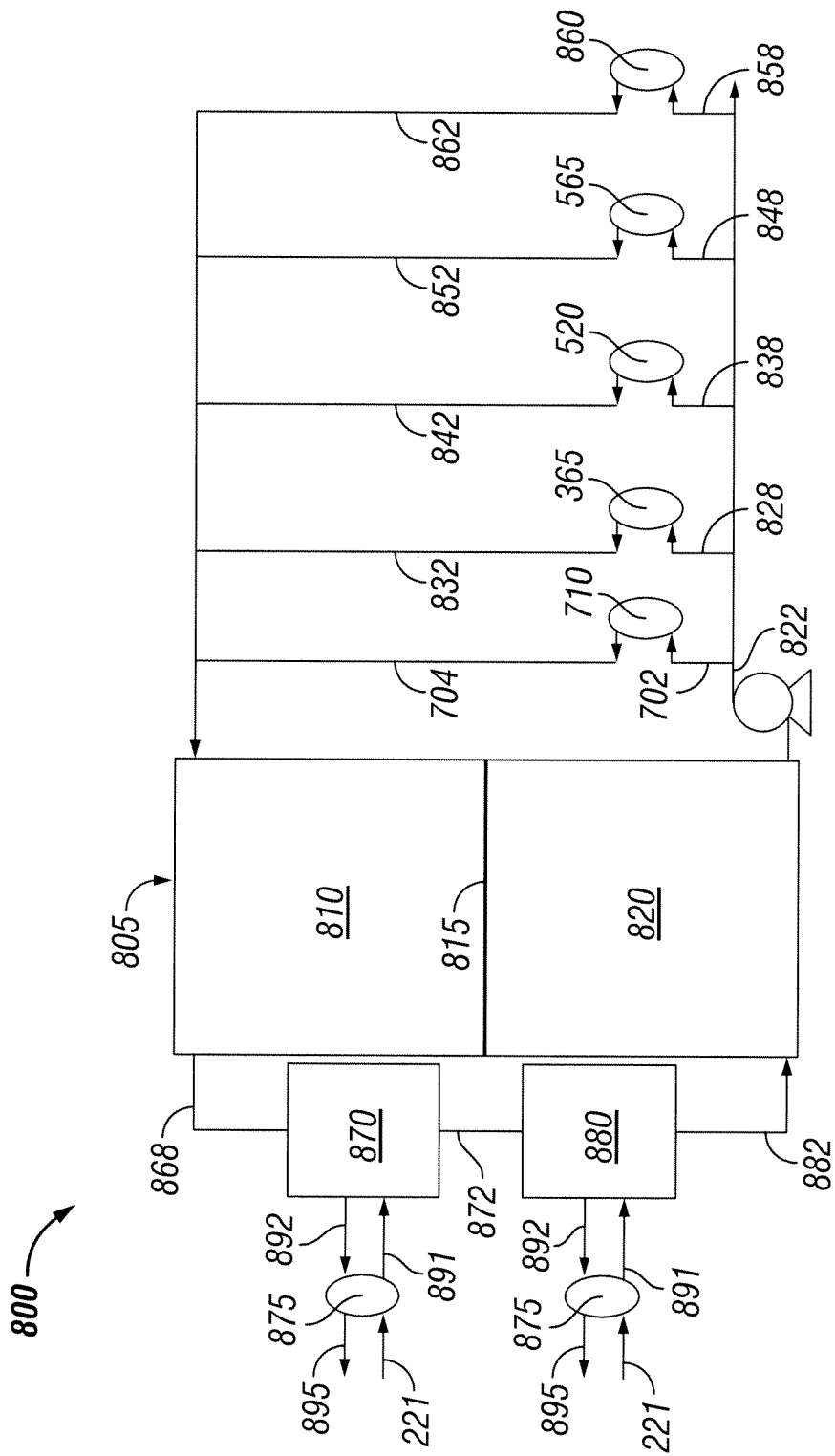
FIG. 8 shows a simplified flowchart of a thermal energy storage system used in conjunction with the integrated desalination and natural gas combined cycle power unit of FIG. 1 in accordance with an exemplary embodiment of the present invention.

The HRSG 730 is an energy recovery heat exchanger that recovers heat from the expanded gas stream 726. The HRSG 730 produces a superheated steam stream 731 that is routed to drive the steam turbine 735. The steam turbine 735 generates a medium pressure ("MP")/low pressure ("LP") steam stream 736, which is routed for sludge drying and pelletizing processes. The steam turbine 735 also produces power 738 which provides power to one or more of several equipment, including, but not limited to, pumps compressors of MVR crystallizers, chloralkali unit 270 (FIG. 2), first stage chiller 870 (FIG. 8), and second stage chiller 880 (FIG. 8). During peak periods, a large portion of the power generated is sold. During non-peak periods, at least a large portion of the power is used to operate equipment, including the first and second stage chillers 870 and 880. Within the steam turbine 735, the superheated steam stream 731 is converted into a saturated steam stream 737 which proceed to the ST condenser 230.

Within the ST condenser 230, the saturated steam stream 737 is converted into a condensed liquid stream 738, which is returned to the HRSG 730. As previously mentioned, heat from the saturated steam stream 737 is transferred to the UF permeate stream 221, which converts the UF permeate stream 221 into the ST condenser preheated seawater stream 231. The HRSG 730 also produces an exhaust stream 740.

FIG. 8 shows a simplified flowchart of a thermal energy storage system 800 used in conjunction with the integrated desalination and natural gas combined cycle power unit 100 of FIG. 1 in accordance with an exemplary embodiment of the present invention. Referring to FIG. 8, the thermal energy storage system 800 includes the Thermal Energy Storage ("TES") chilled water tank 805, the first stage chiller 870, the second stage chiller 880, one or more chiller exchangers 875.

The TES chilled water tank 805 holds chilled supply water 820 and warm return water 810, which are separated by an interface 815. There is a temperature gradient that exists from the bottom of the TES chilled water tank 805 to the top of the TES chilled water tank 805. According to one exemplary embodiment, the chilled supply water 820 is at about thirty-three degrees Fahrenheit. According to one exemplary embodiment, the warm return water 810 is at about forty-five degrees Fahrenheit. The interface 815 is raised or lowered within the TES chilled water tank 805 depending upon the use of the chilled supply water 820 and when the warm return water 810 is chilled through the first stage chiller 870 and the second stage chiller 880, which is explained in further detail below. The chilled water supply 820 exits the TES chilled water tank 805 and is routed to at least one of the CT inlet air chiller 710, the secondary NF flaker/pelletizer 365, the potassium chloride chiller crystallizer 520, the boric acid chiller crystallizer 565, and the bromine condenser 860.

The chilled water supply 820 is routed to the CT inlet air chiller 710 via the CT inlet air chiller water supply stream 702. Within the CT inlet air chiller 710, the CT inlet air chiller water supply stream 702 provides cooling for the air stream 705 (FIG. 7). The CT inlet air chiller water supply stream 702 exits the CT inlet air chiller 710 via the CT inlet air chiller water return stream 704 and is routed back to the TES chilled water tank 805 as warm return water 810.

The chilled water supply 820 is routed to the secondary NF flaker/pelletizer 365 via a secondary NF flaker/pelletizer water supply stream 828. Within the secondary NF flaker/pelletizer 365, the secondary NF flaker/pelletizer water supply stream 828 provides cooling to produce calcium chloride. The secondary NF flaker/pelletizer water supply stream 828 exits the secondary NF flaker/pelletizer 365 via a secondary NF flaker/pelletizer water return stream 832 and is routed back to the TES chilled water tank 805 as warm return water 810.

The chilled water supply 820 is routed to the potassium chloride chiller crystallizer 520 via a potassium chloride chiller crystallizer water supply stream 838. Within the potassium chloride chiller crystallizer 520, the potassium chloride chiller crystallizer water supply stream 838 provides cooling to produce potassium chloride. The potassium chloride chiller crystallizer water supply stream 838 exits the potassium chloride chiller crystallizer 520 via a potassium chloride chiller crystallizer water return stream 842 and is routed back to the TES chilled water tank 805 as warm return water 810.

The chilled water supply 820 is routed to the boric acid chiller crystallizer 565 via a boric acid chiller crystallizer water supply stream 848. Within the boric acid chiller crystallizer 565, the boric acid chiller crystallizer water supply stream 848 provides cooling to produce boric acid. The boric acid chiller crystallizer water supply stream 848 exits the boric acid chiller crystallizer 565 via a boric acid chiller crystallizer water return stream 852 and is routed back to the TES chilled water tank 805 as warm return water 810.

The chilled water supply 820 is routed to the bromine condenser 860 via a bromine condenser water supply stream 858. Within the bromine condenser 860, the bromine condenser water supply stream 858 provides cooling to produce bromine. The bromine condenser water supply stream 858 exits the bromine condenser 860 via a bromine condenser water return stream 862 and is routed back to the TES chilled water tank 805 as warm return water 810.

The return water 810 is chilled using the first stage chiller 870 and the second stage chiller 880. The warm return water 810 exits the TES chilled water tank 805 from substantially the tank's top portion and is routed to the first stage chiller 870 via a chiller water supply stream 868. The first stage chiller 870 produces an intermediate cooled water stream 872 which is routed to the second stage chiller 880. The second stage chiller produces a chilled water stream 882 from the intermediate cooled water stream 872. The chilled water stream 882 is routed back to the TES chilled water tank 805 at substantially the tank's lower portion. According to one exemplary embodiment, the chiller water supply stream 868 is at about sixty degrees Fahrenheit, the intermediate cooled water stream 872 is at bout forty-five degrees Fahrenheit, and the chilled water stream 882 is at about thirty-three degrees Fahrenheit. However, according to other exemplary embodiments, the temperatures can be varied depending upon the user's desires.

Each of the first stage chiller 870 and the second stage chiller 880 operate in similar manners and is therefore described generally. The chiller 870 and 880 use Freon or some other medium, known to people having ordinary skill in the art, to provide cooling to the water streams 868 and 872. A Freon supply stream 891 enters the chillers 870 and 880 and provides chilling to the water streams 868 and 872. A Freon return stream 892 exits the chillers 870 and 880 and is routed to a chiller exchanger 875. According to one exemplary embodiment, the Freon supply stream 891 is in liquid form, while the Freon return stream 892 is in a vapor form. The Freon return stream 892 is cooled within the chiller exchanger 875 and form the Freon supply stream 891 which is recycled back to the chillers 870 and 880. To cool the Freon return stream 892 within the chiller exchanger 875, the UF permeate stream 221 enters the chiller exchanger 875 and is heated therein to form a chiller exchanger preheated seawater stream 895, which then combines with the ST condenser preheated seawater stream 231. In certain exemplary embodiments, there are several exchangers, such as the chiller exchangers 875, positioned in parallel with the ST condenser 230.

During one exemplary operation of the thermal energy storage system 800, the first stage chiller 870 and the second stage chiller 880 are provided power by the steam turbine 735 (FIG. 7). The steam turbine 735 (FIG. 7) provides power to the chillers 870 and 880 during non-peak periods when power pricing is low. The chillers 870 and 880 operate and transform the warm return water 810 sitting at the top portion of the TES chilled water tank 805 into chilled water supply 820 sitting at the bottom portion of the TES chilled water tank 805. The interface 815 is elevationally raised to substantially the top portion of the TES chilled water tank 805. Meanwhile, the chilled water supply 820 is routed to the several equipment users previously described. According to certain exemplary embodiments, the non-peak period is about eight hours to about sixteen hours. During these non-peak periods, the power generated by the steam turbine 735 (FIG. 7) is mostly used for operating equipment.

During the peak periods, which last about eight hours, the chillers 870 and 880 are turned off, thereby no longer converting the warm return water 810 sitting at the top portion of the TES chilled water tank 805 into chilled water supply 820 sitting at the bottom portion of the TES chilled water tank 805. At the beginning of the peak period, the chilled water supply 820 mostly fills the entire TES chilled water tank 805. The chilled water supply 820 is used by the several equipment users previously mentioned. Since the chillers are not operating during this peak period and the chilled water supply 820 is being consumed, the interface 815 is elevationally lowered. By the time the peak period is completed, the interface 815 is elevationally at substantially the bottom portion of the TES chilled water tank 805. This process for turning on the chillers 870 and 880 during non-peak periods and turning off the chillers during peak periods is continued, thereby optimizing power generation profits. Thus, maximum power is sold when the value of power is high and maximum power is consumed by equipment users when the value of power is low.

Figure 9:
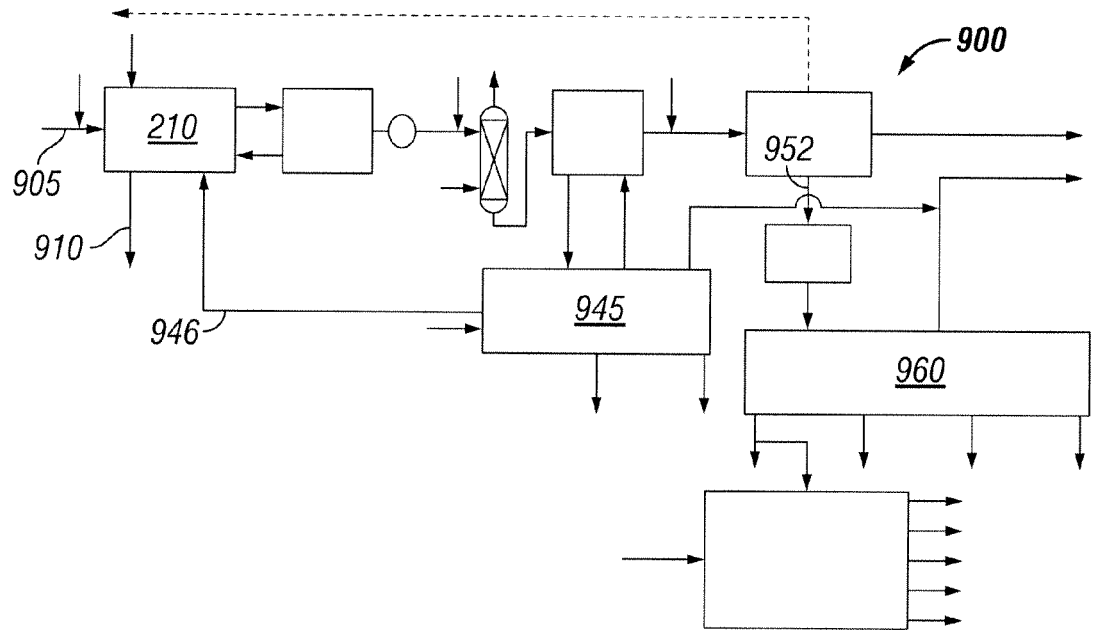
FIG. 9 shows a simplified block diagram of a desalination and minerals extraction process unit in accordance with a second exemplary embodiment of the present invention.

FIG. 9 shows a simplified block diagram of a desalination and minerals extraction process unit 900 in accordance with a second exemplary embodiment of the present invention. The desalination and minerals extraction process unit 900 is similar to the desalination and minerals extraction process unit 110 of FIG. 2, except a) the seawater feedstream 106 (FIG. 2) is changed, b) the pelletizer/dryer 215 (FIG. 2) and its associated streams, the washed filter cake stream 211 (FIG. 2) and iron rich stream 112 (FIG. 2), are removed, and c) the location where the high purity gypsum stream 246 (FIG. 2) is produced is altered. Referring to FIG. 9, the feedstream is a RO brine stream 905, instead of the seawater feedstream 106 (FIG. 2). According to one exemplary embodiment, the RO brine stream 905 is about thirty MGD.

Also, the location where the high purity gypsum stream is produced is altered in the process shown in FIG. 9 when compared to the process illustrated in FIG. 2. First, the settler/filter 210 produces a high purity gypsum stream 910 which is sold to market. According to one exemplary embodiment, the high purity gypsum stream 910 has a flowrate about 1000 sTPD. Second, a first minerals recovery unit 945 produces a gypsum recycle stream 946 that is routed to the settler/filter 910. According to some exemplary embodiments, the gypsum recycle stream 946 includes gypsum slurry and calcium chloride. The embodiment shown in FIG. 9 is adaptable to some of the embodiments described with respect to the above embodiments. For example, a high efficiency RO non-permeate stream 952 can be routed back to a body of water instead of to a second minerals recovery unit 960.

Figure 10:
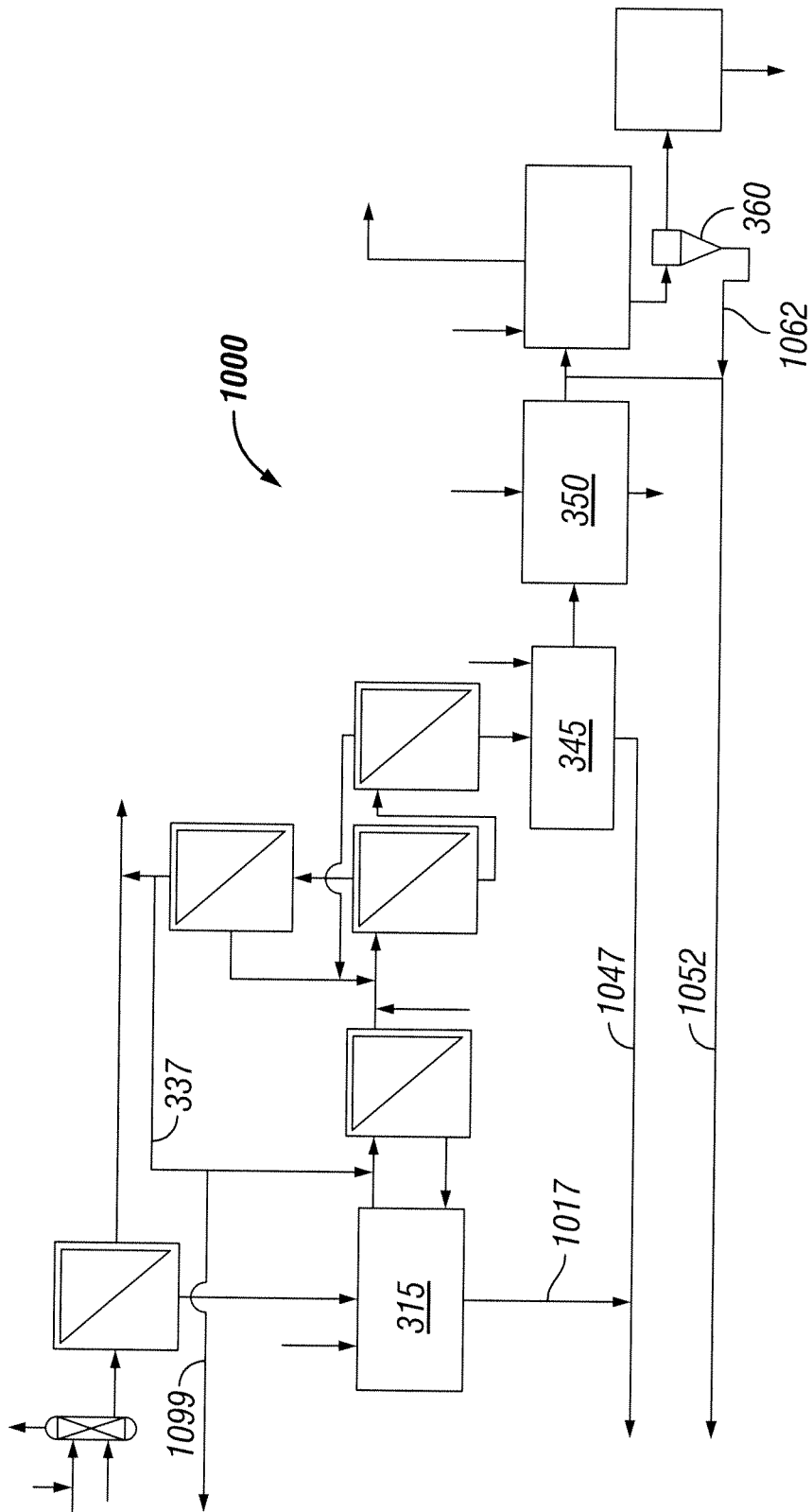
FIG. 10 shows a simplified flowchart of a nanofiltration pretreatment section of the desalination and minerals extraction process unit of FIG. 9 in accordance with the second exemplary embodiment of the present invention.

FIG. 10 shows a simplified flowchart of a nanofiltration pretreatment section 1000 of the desalination and minerals extraction process unit 900 of FIG. 9 in accordance with the second exemplary embodiment of the present invention. The nanofiltration pretreatment section 1000 of the desalination and minerals extraction process unit 900 is similar to the nanofiltration pretreatment section 300 of the desalination and minerals extraction process unit 110 of FIG. 3, except a) the primary NF filter 320 (FIG. 3) and its associated streams, the high purity gypsum stream 246 (FIG. 3), the primary NF filter recycle stream 322 (FIG. 3), and the desalinated water stream 318 (FIG. 3), are removed, b) the primary NF settler hydroclone bottoms stream 317, the gypsum slurry stream 347, the calcium chloride recycle stream 352, and the secondary NF hydroclone sodium chloride slurry stream 362 are rerouted, and c) a second secondary NF permeate slip stream 1099 is added.

Referring to FIG. 10, the primary NF settler hydroclone 315 produces a primary NF settler hydroclone bottoms stream 1017 which is routed to the settler/filter 210. The secondary NF settler hydroclone 345 produces a gypsum slurry stream 1047 which also is routed to the settler/filter 210. The secondary NF settler filter 350 produces a calcium chloride recycle stream 1052 which also is routed to the settler/filter 210. Additionally, the secondary NF hydroclone 360 produces a secondary NF hydroclone sodium chloride slurry stream 1062 that is routed to the settler/filer 210.

Also, according to FIG. 10, the second secondary NF permeate stream 337 provides for the second secondary NF permeate slip stream 1099 which is routed to the settler overflow stream 212. According to some exemplary embodiments, the primary NF settler hydroclone bottoms stream 1017, the gypsum slurry stream 1047, the calcium chloride recycle stream 1052, the secondary NF hydroclone sodium chloride slurry stream 1062, and the second secondary NF permeate slip stream 1099 combine to form the gypsum recycle stream 946 (FIG. 9).

Figure 11:
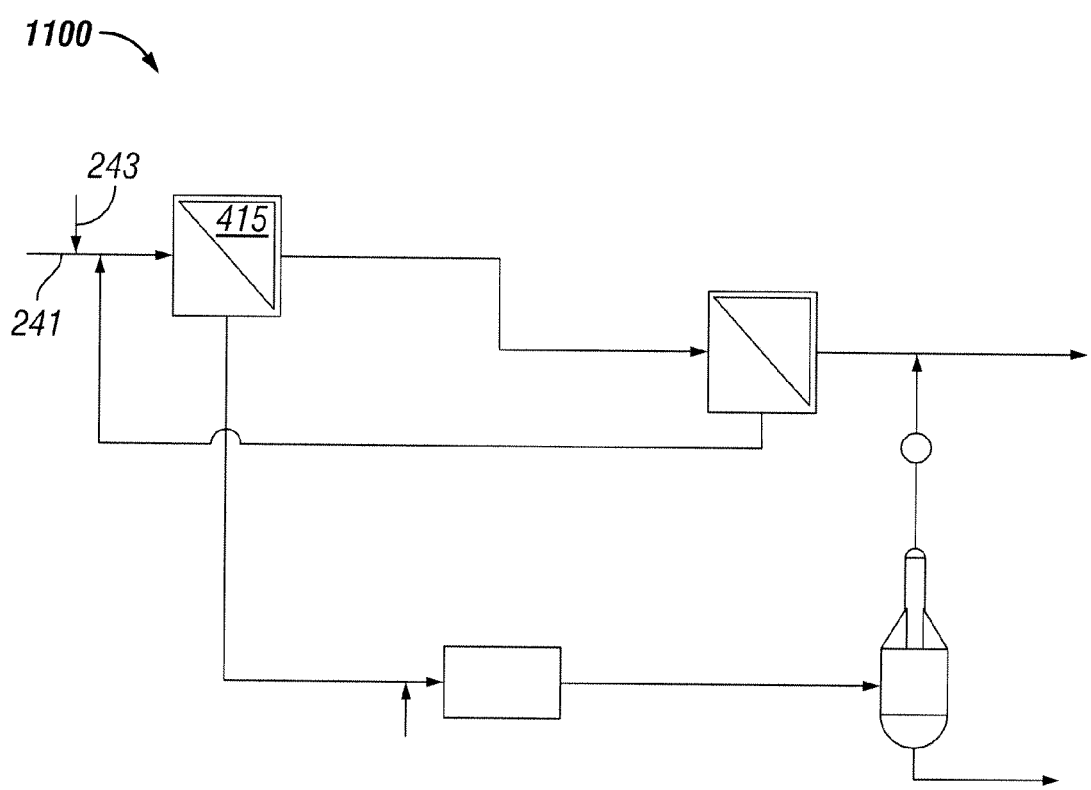
FIG. 11 shows a simplified flowchart of a reverse osmosis section of the desalination and minerals extraction process unit of FIG. 9 in accordance with the second exemplary embodiment of the present invention.

FIG. 11 shows a simplified flowchart of a reverse osmosis section 1100 of the desalination and minerals extraction process unit 900 of FIG. 9 in accordance with the second exemplary embodiment of the present invention. The reverse osmosis section 1100 of the desalination and minerals extraction process unit 900 is similar to the reverse osmosis section 400 of the desalination and minerals extraction process unit 110 of FIG. 4, except a) the first stage RO unit 410 (FIG. 4) and its associated streams, the first stage RO permeate stream 411 and the first stage RO non-permeate stream 412, are removed, and b) the NF permeate stream 241 is rerouted. The NF permeate stream 241 is rerouted to feed the second stage RO unit 415, instead of the removed first stage RO unit 410 (FIG. 4).

Figure 12:
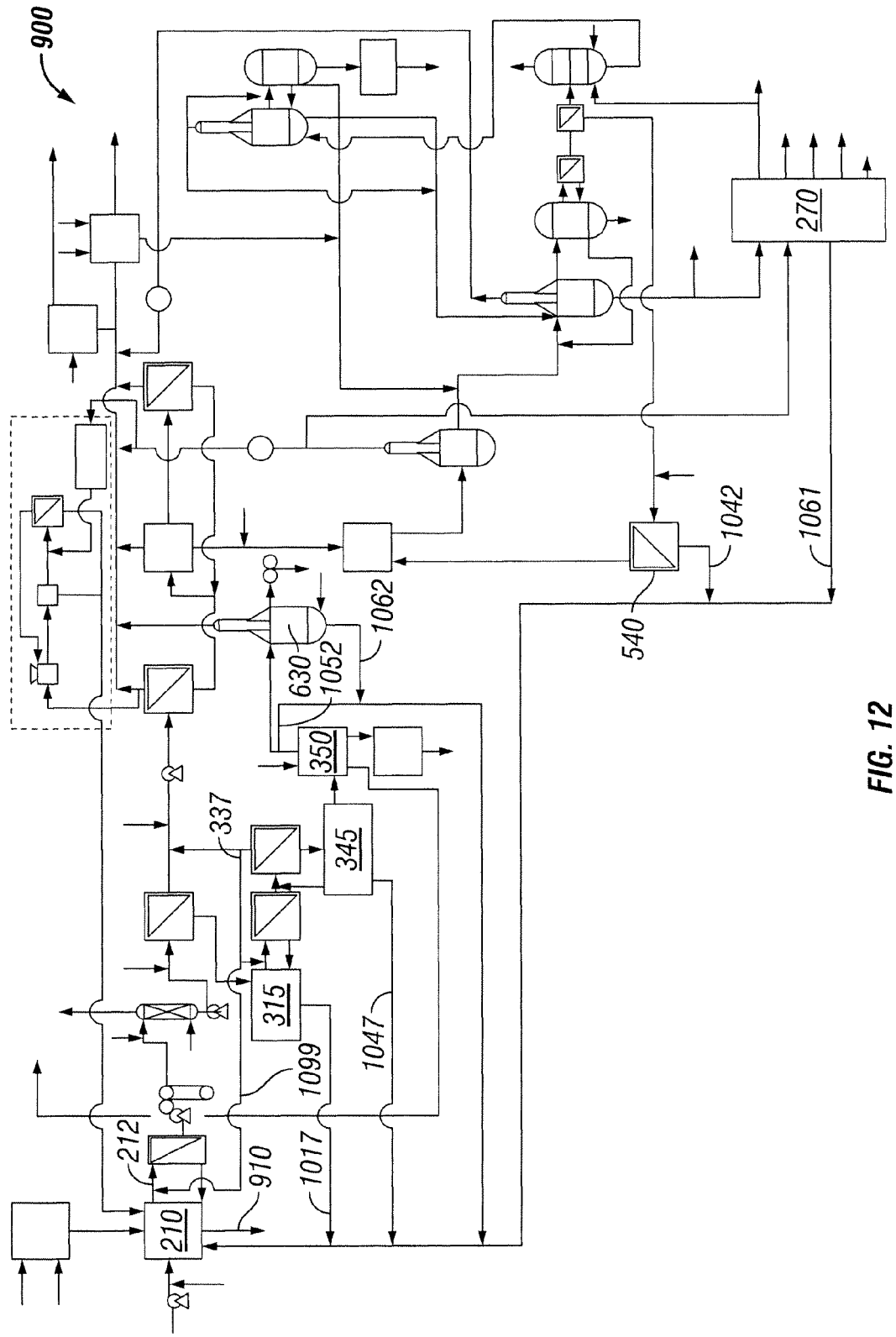
FIG. 12 shows a detailed flowchart of the desalination and minerals extraction process unit of FIG. 9 in accordance with the second exemplary embodiment of the present invention.

FIG. 12 shows a detailed flowchart of the desalination and minerals extraction process unit 900 of FIG. 9 in accordance with the second exemplary embodiment of the present invention. The desalination and minerals extraction process unit 900 is similar to the desalination and minerals extraction process unit 110 of FIG. 6, except for a few differences related to a) the removal of certain equipment and associated streams, b) the location where high purity gypsum is produced, and 3) the rerouting of certain streams. Referring to FIGS. 3, 6, 10, and 12, the primary NF filter 320 (FIG. 3) and its associated streams, the high purity gypsum stream 246 (FIG. 3), the primary NF filter recycle stream 322 (FIG. 3), and the desalinated water stream 318 (FIG. 3), are removed. Thus, according to FIG. 12, the primary NF settler hydroclone bottoms stream 1017, which is produced by the primary NF settler hydroclone 315, is routed to the settler/filter 210.

According to FIG. 12, the settler/filter 210 produces the high purity gypsum stream 910. With respect to the rerouting of certain streams, certain streams that were routed to the gypsum settler/filter 615 have been rerouted to the settler/filter 210. For example, the secondary NF settler hydroclone 345 produces a gypsum slurry stream 1047 which is routed to the settler/filter 210. In another example, the secondary NF settler filter 350 produces a calcium chloride recycle stream 1052 which also is routed to the settler/filter 210. In another example, the secondary NF evaporator 630 produces a secondary NF hydroclone sodium chloride slurry stream 1062 that is routed to the settler/filer 210. In a further example, the secondary NF membrane 540 produces a secondary NF non-permeate stream 1042 that also is routed to the settler/filter 210. Furthermore, the chloralkali plant 270 produces a chloralkali purge stream 1061 that is routed to the settler/filter 210. Also, according to FIG. 12 the second secondary NF permeate stream 337 provides for the second secondary NF permeate slip stream 1099 which is routed to the settler overflow stream 212.

In summary, according to some exemplary embodiments, there is no brine discharge or heated once through cooling water discharge when using the desalination and minerals extraction process 110 (FIG. 2). This prevents environmental issues associated with increased salinity and temperature in the sea water. Also, according to some exemplary embodiments, all sludges and spent chemicals are converted into byproducts and not discharged into the environment. Additionally, the production of byproduct minerals increases the overall revenue. The revenue from the minerals exceeds the typical revenue from processes producing desalinated water without mineral extraction and having a brine discharge stream. Further, the RO membranes operate at basic conditions and at elevated temperatures which allow for lower pressure drop across the membranes and reduced energy costs. Typically, the RO membranes operate at neutral or acidic pHs to prevent carbon scaling. The high pH enables very high rejection of boron and silica (greater than ninety-five percent) even at the elevated operating temperature enabling the desalinated water to be used as boiler feedwater with minimal ion exchange polishing. The high pH RO operation and upstream NF membranes also eliminate bacterial growth (biofouling) and together with the upstream ferric chloride flocculation and UF membrane prevent silica fouling of the membrane. Furthermore, there is a reduce water intake requirement, about by fifty percent, when using the desalination and minerals extraction process 110 (FIG. 2) due to the high yield of desalinated water. This reduce intake decreases the environmental footprint and also reduces pumping power consumption. According to some exemplary embodiments, the desalinated water yield is near 100 percent which reduces the capital cost of the desalination and minerals extraction process 110 (FIG. 2) by about fifteen to about twenty percent. The acidification of the seawater increases the effectiveness of the silt removal and disinfection, thereby reducing the treatment intensity. The high desalinated water yield allows for high desalination plant efficiency without requiring pressure recovery devices for the RO non-permeate streams. This provides approximately an additional five percent capital cost reduction.

Also, reducing the size of the intake system and replacing the reject brine concentrate disposal system with a brine minerals recovery system is near capital neutral, however, this reduction and replacement provides significant net revenue from the byproduct minerals (net of the increased chemical feed costs). Further, high quality desalinated water is produced due to the byproduct minerals recovery. Less than about fifty percent of the desalinated water comes directly from sea water desalination. The majority of the desalinated water is high quality condensate from MVR and high quality permeate from reverse osmosis of brackish water. The high quality water ensures that there will be no long term adverse agricultural impacts of utilizing the desalinated water for irrigation. Furthermore, there are no externally supplied water treating chemicals that are required except for lime/dolime and sodium bisulfite. This allows the plant to be self sufficient, thereby minimizing the external supply risk and storage/inventory requirements. The redundant MVR's and TES system allow the NGCC unit to export most of its power production (at least about eighty percent) during peak conditions and consume nearly all of its power production (about greater than ninety percent) during off-peak conditions. This avoids retail power purchase for the desalination unit, and maximizes export power from the NGCC unit during peak conditions. This provides an increase in power revenue to the NGCC unit by about sixty-seven percent, while reducing the desalination unit's power cost by about ten percent. The biological fouling (barnacles, muscles) is eliminated or minimized due to the acidification, having a pH of less than about 6.5, of the entire desalination inlet stream.

According to some exemplary embodiments, the combination of low pH high iron pre-treatment conditions polymerizes and flocculates the reactive silica, which is then removed by the downstream UF membrane. Operation of the pretreatment system at a pH of less than about six prevents the loss of magnesium by magnesium silicate formation. The presence of iron catalyzes polymerization of silica allowing the downstream UF membrane to remove essentially all of the silica (about ninety-nine percent). According to some exemplary embodiments, the entire inlet seawater stream is pretreated by acidifying it to a pH of less than about six, combining it with silt flocculation, disinfecting it using chlorination, filtrating it using a UF filtration membrane, stripping the carbon dioxide within the seawater using air, and dechlorinating it with sodium bisulfate. This produces a near solids free, pathogen free, carbonate free, dechlorinated seawater that is optimized for NF and RO membranes. According to some exemplary embodiments, all the minerals, salts and sludges are recovered as byproducts, thereby eliminating the concentrate and backwash solids discharge stream. The desalination system is designed so that the primary brine non-permeate stream is analogous in composition to magnesium rich dead sea brine. In some exemplary embodiments, a two stage low pressure drop seawater RO system is utilized, thereby producing about seventy to about seventy-five percent desalinated water yield. Both stages operate at a pH about ten to about eleven and produce low boron, low silica desalinated water. The first stage produces product desalinated water and the second stage produces brackish permeate water (sodium and chloride content above irrigation water standards) and a non-permeate brine. An NF membrane is used on the non-permeate brine to remove hardness (calcium and magnesium), thereby optimizing the brine for monovalent minerals recovery, for example, sodium, chlorine, bromine, and boron.

According to some exemplary embodiments, a low pressure drop three stage brackish water RO membrane operating at a pH of about ten to about eleven is utilized. The three stage brackish RO membrane produces about a ninety percent yield of high quality desalinated water permeate (low boron and sodium chloride) and a non-permeate brine suitable for boric acid recovery. Also, in some exemplary embodiments, the waste heat from the NGCC system is utilized to preheat the desalinated water, thereby increasing the RO capacity by approximately thirty percent for the same pressure drop and membrane area. In some exemplary embodiments, 2×100% MVR evaporators and 2×100% chloralkali units are utilized to provide brine processing redundancy and allow off-peak only operation when both evaporators and chlor-alkali units are operational. Further, in some exemplary embodiments, a thermal energy storage system and inlet air chillers to the combustion turbine are utilized to allow off-peak power to meet the refrigeration requirements of the inlet air chillers and brine chillers.

Although exemplary flowrates, pHs, concentrations, and efficiencies have been provided with respect to the processes described above, alternative flowrates, pHs, concentrations, and/or efficiencies can be used without departing from the scope and spirit of the exemplary embodiment. Additionally, although a second minerals recovery unit has been utilized within the processes described above, the second minerals recovery unit can be integrated with the first minerals recovery unit without departing from the scope and spirit of the exemplary embodiment. Furthermore, although certain equipments and streams have been described for the processes described above, greater or fewer equipment can be used and/or the stream destinations may be altered, so long as the goals of each equipment has been maintained within the process, without departing from the scope and spirit of the exemplary embodiment.

Although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the invention. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

What is claimed is:

1. A desalination and minerals extraction system, comprising:
    a desalination facility comprising:
        a nanofiltration membrane section producing a first desalination tailings stream; and
        a reverse osmosis membrane section producing a second desalination tailings stream and a desalination facility desalinated water outlet stream,
        wherein the first desalination tailings stream, the second desalination tailings stream, and the desalination facility desalinated water outlet stream are formed from an inlet feed stream entering the desalination facility; and
    a minerals extraction facility configured to produce a plurality of mineral compounds, a minerals extraction facility tailings stream, and a minerals extraction facility desalinated water outlet stream, the minerals extraction facility is fluidly coupled to the desalination facility, wherein the first desalination tailings stream is fed into the minerals extraction facility, and wherein the minerals extraction facility comprises:
        a first settler configured to receive the first desalination tailings stream, to mix the first desalination tailings stream with a first lime material, to provide a first output stream comprising a first portion of the plurality of mineral compounds, and to provide a second output stream comprising a magnesium solution, wherein the first portion of the plurality of mineral comprises a high purity gypsum having greater than 95 percent of a sulfate from the first desalination tailings stream; and
        a second settler configured to receive at least a portion of the second output stream, to mix the portion of the second output stream with a second lime material, and to provide a third output stream comprising a second portion of the plurality of mineral compounds, wherein the second portion of the plurality of mineral compounds comprises high purity magnesium hydroxide.

2. The desalination and minerals extraction system of claim 1, wherein the minerals extraction facility tailings stream is recycled back to the desalination facility.

3. The desalination and minerals extraction system of claim 1, wherein the second desalination tailings stream is configured to be fed to the minerals extraction facility, the second desalination tailings stream comprises a third portion of the plurality of mineral compounds, and the third portion of the plurality of mineral compounds comprises at least one of a high purity salt, a high purity potassium chloride, a high purity bromine, and a high purity boric acid.

4. The desalination and minerals extraction system of claim 3, wherein a portion of the high purity salt is routed to a chloralkali unit, the chloralkali unit producing at least one chemical selected from the group consisting of iron chloride, hydrochloric acid, chlorine, sodium hydroxide, and sodium hypochlorite, the at least one chemical being used within at least one of the desalination facility and the minerals extraction facility.

5. The desalination and minerals extraction system of claim 1, wherein the second desalination tailings stream is discharged into a body of water.

6. The desalination and minerals extraction system of claim 1, wherein the minerals extraction facility comprises:
    a first minerals extraction system configured to receive the first desalination tailings stream, wherein the first minerals extraction system is configured to produce the high purity magnesium hydroxide and calcium chloride; and
    a second minerals extraction system configured to receive the second desalination tailings stream, wherein the second minerals extraction system is configured to produce a third portion of the plurality of mineral compounds comprising at least one of a high purity salt, a high purity potassium chloride, a high purity bromine, and a high purity boric acid.

7. The desalination and minerals extraction system of claim 6, wherein a portion of the high purity salt is routed to a chloralkali unit, the chloralkali unit producing at least one chemical selected from the group consisting of iron chloride, hydrochloric acid, chlorine, sodium hydroxide, and sodium hypochlorite, the at least one chemical being used within at least one of the desalination facility and the minerals extraction facility.

8. The desalination and minerals extraction system of claim 6, wherein no streams are discharged into a body of water.

9. The desalination and minerals extraction system of claim 1, wherein the nanofiltration membrane section further produces a nanofiltration membrane permeate stream, the nanofiltration membrane permeate stream feeding into the reverse osmosis membrane section.

10. The desalination and minerals extraction system of claim 1, wherein the second desalination tailings stream from the reverse osmosis membrane section is routed to the nanofiltration membrane section.

11. The desalination and minerals extraction system of claim 1, wherein the nanofiltration membrane section comprises:
    a primary NF membrane configured to produce a primary NF permeate stream and a primary NF non-permeate stream; and
    a secondary NF membrane comprising:
        a first secondary NF membrane configured to produce a first secondary NF permeate stream and a first secondary NF non-permeate stream;
        a second secondary NF membrane configured to produce a second secondary NF permeate stream and a second secondary NF non-permeate stream; and
        a third secondary NF membrane configured to produce a third secondary NF permeate stream and a third secondary NF non-permeate stream;
    wherein the primary NF permeate stream is routed to the reverse osmosis membrane section and at least a portion of the primary NF non-permeate stream is routed towards the first secondary NF membrane,
    wherein the first secondary NF permeate stream is routed to the second secondary NF membrane and the first secondary NF non-permeate stream is routed to the third secondary NF membrane,
    wherein at least a portion of the second secondary NF permeate stream is routed to the reverse osmosis membrane section and the second secondary NF non-permeate stream is routed to the first secondary NF membrane, and wherein the third secondary NF permeate stream is routed to the first secondary NF membrane, the third secondary NF non-permeate stream is routed to the minerals extraction facility, and the third secondary NF non-permeate stream forms part of the first desalination tailings stream.

12. The desalination and minerals extraction system of claim 1, wherein the reverse osmosis membrane section comprises:

a first stage reverse osmosis unit configured to produce a first stage reverse osmosis permeate stream and a first stage reverse osmosis non-permeate stream;

a second stage reverse osmosis unit configured to produce a second stage reverse osmosis permeate stream and a second stage reverse osmosis non-permeate stream;

a third stage reverse osmosis unit configured to produce a third stage reverse osmosis permeate stream and a third stage reverse osmosis non-permeate stream, wherein the first stage reverse osmosis permeate stream is combined with the third stage reverse osmosis permeate stream to form the desalination facility desalinated water outlet stream and the first stage reverse osmosis non-permeate stream is routed to the second stage reverse osmosis unit, wherein the second stage reverse osmosis permeate stream is routed to the third stage reverse osmosis unit and the second stage reverse osmosis non-permeate stream is routed towards the minerals extraction facility and forms part of the second desalination tailings stream, and wherein the third stage reverse osmosis non-permeate stream is routed to the first stage reverse osmosis unit.

13. The desalination and minerals extraction system of claim 1, further comprising a natural gas combined cycle power unit integrated with at least one of the desalination facility and the minerals extraction facility, the natural gas combined cycle power unit comprising a steam turbine, the steam turbine producing power for one or more equipment within the desalination facility and the minerals extraction facility.

14. The desalination and minerals extraction system of claim 13, wherein the natural gas combined cycle power unit further comprises a steam turbine condenser, the steam turbine condenser used to transfer heat from a steam turbine discharge stream exiting the steam turbine to the inlet feed stream entering the desalination facility.

15. The desalination and minerals extraction system of claim 13, further comprising:

one or more thermal energy storage chilled water tanks for storing at least one of a warm return water and a chilled supply water, the chilled supply water being elevationally positioned below the warm return water; and one or more chillers fluidly coupled to the thermal energy storage chilled water tank, the one or more chillers receiving the warm return water from the thermal energy storage chilled water tank, converting the return warm water into chilled supply water, and returning the chilled supply water to the thermal energy storage chilled water tank, wherein the chilled supply water from the thermal energy storage chilled water tank is supplied to at least one of the desalination facility, minerals extraction facility, and the natural gas combined cycle power unit, and wherein the natural gas combined cycle power unit provides power to at least the one or more chillers.

16. The desalination and minerals extraction system of claim 15, wherein the natural gas combined cycle power unit provides power to the one or more chillers during non-peak periods, thereby converting the warm return water into the chilled supply water, wherein the natural gas combined cycle power unit provides zero power to the one or more chillers during peak periods, and wherein a substantial portion of the power generated from the natural gas combined cycle power unit is sold during peak periods.

17. A desalination and minerals extraction system, comprising:

a desalination facility comprising:

a nanofiltration membrane section configured to produce a first desalination tailings stream; and a reverse osmosis membrane section configured to produce a second desalination tailings stream and a desalination facility desalinated water outlet stream, wherein the first desalination tailings stream, the second desalination tailings stream, and the desalination facility desalinated water outlet stream are formed from an inlet feed stream entering the desalination facility; and a minerals extraction facility configured to produce a plurality of mineral compounds, a minerals extraction facility tailings stream, and a minerals extraction facility desalinated water outlet stream, the minerals extraction facility fluidly coupled to the desalination facility, wherein the first desalination tailings stream is fed into the minerals extraction facility, and wherein the minerals extraction facility comprises:

a first settler configured to receive the first desalination tailings stream to mix the first desalination tailings stream with a first lime material, to provide a first output stream comprising a first portion of the plurality of mineral compounds, and to provide a second output stream comprising a magnesium solution, wherein the first portion of the plurality of mineral compounds comprises high purity gypsum; and a second settler configured to receive at least a portion of the second output stream, to mix the portion of the second output stream with a second lime material, and to provide a third output stream comprising a second portion of the plurality of mineral compounds, wherein the second portion of the plurality of mineral compounds comprises a high purity magnesium hydroxide.

18. The desalination and minerals extraction system of claim 17, comprising a natural gas combined cycle power unit integrated with at least one of the desalination facility and the minerals extraction facility, the natural gas combined cycle power unit comprising a steam turbine, the steam turbine producing power for one or more equipment within the desalination facility and the minerals extraction facility, wherein the natural gas combined cycle power unit further comprises a steam turbine condenser, the steam turbine condenser used to transfer heat from a steam turbine discharge stream exiting the steam turbine to the inlet feed stream entering the desalination facility.

19. The desalination and minerals extraction system of claim 18, further comprising:

one or more thermal energy storage chilled water tanks for storing at least one of a warm return water and a chilled supply water, the chilled supply water being elevationally positioned below the warm return water; and one or more chillers fluidly coupled to the thermal energy storage chilled water tank, the one or more chillers receiving the warm return water from the thermal energy storage chilled water tank, converting the return warm water into chilled supply water, and returning the chilled supply water to the thermal energy storage chilled water tank, wherein the chilled supply water from the thermal energy storage chilled water tank is supplied to at least one of the desalination facility, minerals extraction facility, and the natural gas combined cycle power unit, and wherein the natural gas combined cycle power unit provides power to at least the one or more chillers.

20. The desalination and minerals extraction system of claim 19, wherein the natural gas combined cycle power unit provides power to the one or more chillers during non-peak periods, thereby converting the warm return water into the chilled supply water, wherein the natural gas combined cycle power unit provides zero power to the one or more chillers during peak periods, wherein a substantial portion of the power generated from the natural gas combined cycle power unit is sold during peak periods, and wherein the chilled supply water is continuously supplied from the thermal energy storage chilled water tank to at least one of the desalination facility, minerals extraction facility, and the natural gas combined cycle power unit during peak periods and off-peak periods.

21. The desalination and minerals extraction system of claim 19, wherein the natural gas combined cycle power unit provides power to the one or more chillers during non-peak periods, thereby converting the warm return water into the chilled supply water, wherein the natural gas combined cycle power unit provides zero power to the one or more chillers during peak periods, wherein a substantial portion of the power generated from the natural gas combined cycle power unit is sold during peak periods, and wherein the chilled supply water is continuously supplied from the thermal energy storage chilled water tank to at least one of the desalination facility, minerals extraction facility, and the natural gas combined cycle power unit during peak periods and off-peak periods.

22. The desalination and minerals extraction system of claim 17, wherein the minerals extraction facility tailings stream is recycled back to the desalination facility.

23. The desalination and minerals extraction system of claim 17, wherein the second desalination tailings stream is configured to be fed to the minerals extraction facility, and the second desalination tailings stream comprises a third portion of the plurality of mineral compounds, and the third portion of the plurality of mineral compounds comprises at least one of a high purity salt, a high purity potassium chloride, a high purity bromine, and a high purity boric acid.

24. The desalination and minerals extraction system of claim 23, wherein a portion of the high purity salt is routed to a chloralkali unit, the chloralkali unit producing at least one chemical selected from the group consisting of iron chloride, hydrochloric acid, chlorine, sodium hydroxide, and sodium hypochlorite, the at least one chemical being used within at least one of the desalination facility and the minerals extraction facility.

25. The desalination and minerals extraction system of claim 17, wherein the second desalination tailings stream is discharged into a body of water.

26. The desalination and minerals extraction system of claim 17, wherein the minerals extraction facility comprises:

a first minerals extraction system configured to receive the first desalination tailings stream, wherein the first minerals extraction system is configured to produce the high purity gypsum; and a second minerals extraction system configured to receive the second desalination tailings stream, wherein the second minerals extraction system produces is configured to produce at least one of a high purity salt, a high purity potassium chloride, a high purity bromine, and a high purity boric acid.

27. The desalination and minerals extraction system of claim 26, wherein a portion of the high purity salt is routed to a chloralkali unit, the chloralkali unit producing at least one chemical selected from the group consisting of iron chloride, hydrochloric acid, chlorine, sodium hydroxide, and sodium hypochlorite, the at least one chemical being used within at least one of the desalination facility and the minerals extraction facility.

28. The desalination and minerals extraction system of claim 26, wherein no streams are discharged into a body of water.

29. A desalination and minerals extraction system, comprising:

a desalination facility comprising:
a nanofiltration membrane section configured to produce first desalination tailings stream; and
a reverse osmosis membrane section configured to produce a second desalination tailings stream and a desalination facility desalinated water outlet stream,
wherein the first desalination tailings stream, the second desalination tailings stream, and the desalination facility desalinated water outlet stream are formed from an inlet feed stream entering the desalination facility;

a minerals extraction facility configured to produce a plurality of mineral compounds, a minerals extraction facility tailings stream, and a minerals extraction facility desalinated water outlet stream, the minerals extraction facility fluidly coupled to the desalination facility, wherein the first tailings stream is fed into the minerals extraction facility, and wherein the minerals extraction facility comprises:
a first settler configured to receive the first desalination tailings stream, to mix the first desalination tailings stream with a first lime material, to provide a first output stream comprising a first portion of the plurality of mineral compounds, and to provide a second output stream comprising a magnesium solution, wherein the first portion of the plurality of mineral compounds comprises high purity gypsum having greater than 95 percent of a sulfate from the first desalination tailings stream; and
a second settler configured to receive at least a portion of the second output stream, to mix the portion of the second output stream with a second lime material, and to provide a third output stream comprising a second portion of the plurality of mineral compounds, wherein the second portion of the plurality of mineral compounds comprises a high purity magnesium hydroxide;

a natural gas combined cycle power unit integrated with at least one of the desalination facility and the minerals extraction facility, the natural gas combined cycle power unit comprising a steam turbine, the steam turbine producing power for one or more equipment within the desalination facility and the minerals extraction facility;

one or more thermal energy storage chilled water tanks for storing at least one of a warm return water and a chilled supply water; and
one or more chillers fluidly converting the return warm water into chilled supply water,
wherein the chilled supply water from the thermal energy storage chilled water tank is supplied to at least one of the desalination facility, minerals extraction facility, and the natural gas combined cycle power unit, and
wherein the natural gas combined cycle power unit provides power to at least the one or more chillers.

30. A method for desalinating water, the method comprising:
processing an inlet feed stream within a desalination facility to produce a desalinated water stream and a desalination tailings stream;
forming mineral compounds within a mineral extraction facility from the desalination tailings stream, wherein the minerals extraction facility comprises a first settler and a second settler;
receiving the desalination tailings stream at the first settler;
mixing the desalination tailings stream with a first lime material using the first settler;
providing from the first settler a first output stream comprising a first portion of the mineral compounds and a second output stream comprising a magnesium solution, wherein the first portion of the mineral compounds comprises high purity gypsum having greater than 95 percent of a sulfate from the desalination tailings stream;
receiving at least a portion of the second output stream at the second settler;
mixing the portion of the second output stream with a second lime material using the second settler; and
providing from the second settler a third output stream comprising a second portion of the mineral compounds, wherein the second portion of the mineral compounds comprises high purity magnesium hydroxide.

31. The method of claim 30, further comprising
providing power to at least one of the desalination facility and the minerals extraction facility from a natural gas combined cycle power unit.

32. The method of claim 31, further comprising using a thermal energy storage chilled water tank to provide a chilled water stream to at least one of the desalination facility and the minerals extraction facility, the thermal energy storage chilled water tank using one or more chillers to form the chilled water stream.

33. The method of claim 32, wherein the natural gas combined cycle power unit provides power to the one or more chillers during a non-peak period and delivers no power to the one or more chillers during peak periods, and wherein an increased amount of power is sold during peak periods than during non-peak periods.

* * * * *